(12) United States Patent
Greenhalgh et al.

(10) Patent No.: US 7,925,866 B2
(45) Date of Patent: *Apr. 12, 2011

(54) DATA PROCESSING APPARATUS AND METHOD FOR HANDLING INSTRUCTIONS TO BE EXECUTED BY PROCESSING CIRCUITRY

(75) Inventors: Peter Richard Greenhalgh, Cambridge (GB); Andrew Christopher Rose, Cambridge (GB); Simon John Craske, Cambridge (GB); Max Zardini, Cambridge (GB)

(73) Assignee: ARM Limited, Cambridge (GB)

( * ) Notice: Subject to any disclaimer, the term of this patent is extended or adjusted under 35 U.S.C. 154(b) by 168 days.

This patent is subject to a terminal disclaimer.

(21) Appl. No.: 12/314,095

(22) Filed: Dec. 3, 2008

(65) Prior Publication Data

US 2009/0249033 A1   Oct. 1, 2009

Related U.S. Application Data

(63) Continuation-in-part of application No. 12/010,305, filed on Jan. 23, 2008, now Pat. No. 7,747,839.

(51) Int. Cl.
*G06F 9/30* (2006.01)
(52) U.S. Cl. .......... 712/213; 712/43; 712/229; 711/125; 711/129
(58) Field of Classification Search .................. 711/125, 711/129; 710/43, 213, 229; 712/43, 213, 712/229
See application file for complete search history.

(56) References Cited

U.S. PATENT DOCUMENTS 5,335,331 A   8/1994  Murao et al.
(Continued)

FOREIGN PATENT DOCUMENTS

WO   WO 2006/125219   11/2006
(Continued)

OTHER PUBLICATIONS

UK Search Report dated Mar. 23, 2009 for GB 0821520.4.
(Continued)

*Primary Examiner* — William M Treat
(74) *Attorney, Agent, or Firm* — Nixon & Vanderhye P.C.

(57) ABSTRACT

A data processing apparatus and method are provided for handling instructions to be executed by processing circuitry. The processing circuitry has a plurality of processor states, each processor state having a different instruction set associated therewith. Pre-decoding circuitry receives the instructions fetched from the memory and performs a pre-decoding operation to generate corresponding pre-decoded instructions, with those pre-decoded instructions then being stored in a cache for access by the processing circuitry. The pre-decoding circuitry performs the pre-decoding operation assuming a speculative processor state, and the cache is arranged to store an indication of the speculative processor state in association with the pre-decoded instructions. The processing circuitry is then arranged only to execute an instruction in the sequence using the corresponding pre-decoded instruction from the cache if a current processor state of the processing circuitry matches the indication of the speculative processor state stored in the cache for that instruction. This provides a simple and effective mechanism for detecting instructions that have been corrupted by the pre-decoding operation due to an incorrect assumption of processor state.

15 Claims, 30 Drawing Sheets

U.S. PATENT DOCUMENTS

| | | | |
|---|---|---|---|
| 5,740,461 | A | 4/1998 | Jaggar |
| 5,761,490 | A | 6/1998 | Hunt |
| 6,009,512 | A | 12/1999 | Christie |
| 6,081,884 | A | 6/2000 | Miller |
| 6,253,287 | B1 | 6/2001 | Green |
| 6,304,963 | B1 | 10/2001 | Elwood |
| 6,314,509 | B1 | 11/2001 | Tremblay et al. |
| 6,560,694 | B1 | 5/2003 | McGrath et al. |
| 6,807,626 | B1 | 10/2004 | Cofler et al. |
| 6,820,194 | B1 | 11/2004 | Bidichandani et al. |
| 6,952,754 | B2 | 10/2005 | O'Connor et al. |
| 7,415,638 | B2 | 8/2008 | Smith et al. |
| 7,676,659 | B2 | 3/2010 | Stempel et al. |
| 2002/0004897 | A1 | 1/2002 | Kao et al. |
| 2004/0133764 | A1 | 7/2004 | O'Connor et al. |
| 2006/0265573 | A1 | 11/2006 | Smith et al. |
| 2007/0033383 | A1 | 2/2007 | Blasco Allue et al. |
| 2007/0226464 | A1 | 9/2007 | Chaudhry et al. |
| 2007/0260854 | A1 | 11/2007 | Smith et al. |
| 2009/0119485 | A1 | 5/2009 | Smith et al. |

FOREIGN PATENT DOCUMENTS

| | | |
|---|---|---|
| WO | WO 2008/113007 | 9/2008 |

OTHER PUBLICATIONS

U.S. Appl. No. 12/010,312, filed Jan. 23, 2008, Greenhalgh et al.
U.S. Appl. No. 12/010,318, filed Jan. 23, 2008, Greenhalgh et al.
U.S. Appl. No. 12/010,305, filed Jan. 23, 2008, Greenhalgh et al.
U.S. Appl. No. 12/010,316, filed Jan. 23, 2008, Greenhalgh et al.
U.S. Appl. No. 12/010,313, filed Jan. 23, 2008, Greenhalgh et al.
Office Action mailed Jun. 2, 2010 in co-pending U.S. Appl. No. 12/010,313.
Office Action mailed Jun. 8, 2010 in co-pending U.S. Appl. No. 12/010,312.
Office Action mailed Jun. 21, 2010 in co-pending U.S. Appl. No. 12/010,316.
Widdoes, Jr., "The S-1 Project: Developing High-Performance Digital Computers", *IEEE Computer Society, COMPCON*, Feb. 1980, pp. 1-10.
Intrater, "Performance Evaluation of a Decoded Instruction Cache for Variable Instruction Length Computers", *IEEE*, vol. 43, No. 10, Oct. 1994, pp. 1140-1150.
Chan et al., "Design of the HP PA 7200 CPU", *Hewlett-Packard Journal*, Feb. 1996, pp. 1-11.
AMD-K5 Processor, Publication #18522, Sep. 1996, pp. 1-73.
Klaiber, "The Technology Behind Crusoe Processors", *Transmeta Corporation*, Jan. 2000, pp. 1-18.
Smotherman, "S-1 Supercomputer", May 2006, www.cs.clemson.edu, pp. 1-10.
Office Action mailed Nov. 8, 2010 in co-pending U.S. Appl. No. 12/010,312.

Thumb-16 Opcode

| 16 | 15:0 |
|---|---|
| 1'b0 (ID) | Thumb-16 Opcode (not modified) |

Thumb-32 Opcode

| 33 | 32:17 | 16 | 15:14 | 13:0 |
|---|---|---|---|---|
| 1'b0 (ID) | 2nd half of Thumb-32 Opcode (not modified) | 1'b1 (ID) | Sideband Signals | 1st 14-bits of Thumb-32 Opcode (not modified) |

FIG. 9

| Native Instruction Stream | Pre-decode Speculation | Notes |
|---|---|---|
| t16 | T16 | Correct |
| t32a t32b | T32a T32b | Correct |
| t32b t16 | T16 T16 | Always correct if branch into T16 or continue from previous cache line (as t16 and t32b are equivalent) |
| | T32a T32b | Always correct if branch into T32b (as t16 and t32b are equivalent). Pre-decode error if continuing from previous cache line (detect 2 consecutive T32a) |
| t32b t32a t32b | T16 T32a T32b | Always correct (as t16 and t32b are equivalent) |
| | T32a T32b T16 | Pre-decode error on branch into T32b (ID bit indicates T16 instruction, but [15:13] opcode bits indicate that it should be T32a), Pre-decode error if continuing from previous cache line (detect 2 consecutive T32a) |
| | T32a T32b T32a | Pre-decode error on branch in or continuing from previous cache line |

FIG. 10

Thumb-32 Opcode including 'incomplete' bit

| 35 | 34 | 33:18 | 17 | 16 | 15:14 | 13:0 |
|---|---|---|---|---|---|---|
| 1'b0 | 1'b0 (ID) | 2nd half of Thumb-32 Opcode (not modified) | Incomplete | 1'b1 (ID) | Sideband Signals | 1st 14-bits of Thumb-32 Opcode (not modified) |

FIG. 12

Thumb-16 Opcode including a single sideband signal

| 17 | 16 | 15:0 |
|---|---|---|
| Sideband | 1'b0 (ID) | Thumb-16 Opcode (not modified) |

Thumb-32 Opcode including Thumb-16 only sideband signal at bit-35

| 35 | 34 | 33:18 | 17 | 16 | 15:14 | 13:0 |
|---|---|---|---|---|---|---|
| Sideband (T16 only) | 1'b0 (ID) | 2nd half-word of Thumb-32 Opcode (not modified) | Incomplete | 1'b1 (ID) | Sideband | 1st 14-bits of Thumb-32 Opcode (not modified) |

FIG. 15

| 35 | 34 | 33:18 | 17 | 16 | 15:14 | 13 | 12:0 |
|---|---|---|---|---|---|---|---|
| 'N' CC | 'C' CC | ARM→Thumb Translated Opcode | 'Z' CC | 'V' CC | Sideband | ARM Only | ARM→Thumb Translated Opcode |

FIG. 25

ADC (register), Thumb-32
```
       Half-word 2                    |        Half-word 1
3 | 322 | 2222 | 22  | 22 | 1111 | 11111 | 1
1 | 098 | 7654 | 32  | 10 | 9876 | 54321 | 09 | 8765 | 4 | 3210 |
(0)| imm3 | Rd | imm2 | type | Rm | 11101 | 01 | 1010 | S | Rn |
```

ADC (register), ARM
```
3322 | 22 | 2 | 2222 | 2 | 1111 | 1111 | 11
1098 | 76 | 5 | 4321 | 0 | 9876 | 5432 | 10987 | 65 | 4 | 3210 |
cond | 00 | 0 | 0101 | S | Rn   | Rd   | imm5  | type | 0 | Rm |
```

ADC (register), Thumb-32 (Pre-decoded)
```
33 | 3 | 333 | 2222 | 22 | 22 | 2211 | 11 | 11 | 111 | 1
54 | 3 | 210 | 9876 | 54 | 32 | 1098 | 76 | 54 | 321 | 09 | 8765 | 4 | 3210 |
S I|   |                                 |    | I I| SS |
B D| (0)| imm3 | Rd | imm2 | type | Rm | ND | BB | 101 | 01 | 1010 | S | Rn |
```

ADC (register), ARM (Pre-decoded to Thumb-32)
```
33 | 3 | 333 | 2222 | 22 | 22 | 2211 | 11 | 11 | 1 | 11 | 1
54 | 3 | 210 | 9876 | 54 | 32 | 1098 | 76 | 54 | 3 | 21 | 09 | 8765 | 4 | 3210 |
   |   |                                 |    | SS |
NC | (0)| imm3 | Rd | imm2 | type | Rm | ZV | BB | A | 01 | 01 | 1010 | S | Rn |
```

Key:
SB = Sideband          NC = N and C condition codes
ID = Identification bit   ZV = Z and V condition codes
IN = Incomplete bit    A = ARM only bit

FIG. 26

ADC (register-shifted register), ARM only
```
3322 | 22 | 2 | 2222 | 2 | 1111 | 1111 | 11
1098 | 76 | 5 | 4321 | 0 | 9876 | 5432 | 1098 | 7 | 65 | 4 | 3210 |
cond | 00 | 0 | 0101 | S | Rn   | Rd   | Rs   | 0 | type | 1 | Rm |
```

ADC (register-shifted register), ARM only (Pre-decoded to Thumb-32)
```
33 | 3 | 3 | 33 | 2222 | 22 | 22 | 2211 | 11 | 11 | 1 | 11 | 1
54 | 3 | 2 | 10 | 9876 | 54 | 32 | 1098 | 76 | 54 | 3 | 21 | 09 | 8765 | 4 | 3210 |
   |   |                             |    | SS |
NC | 1 | 0 | Rs[1:0] | Rd | imm2 | Rs[3:2] | Rm | ZV | BB | A | 01 | 01 | 1010 | S | Rn |
```

FIG. 27

MERGED SPECULATIVE PROCESSOR STATE/INVALID FIELD

| BIT 1 | BIT 0 | MEANING |
|-------|-------|---------|
| 0 | 0 | ARM STATE |
| 0 | 1 | THUMB STATE |
| 1 | 0 | JAZELLE STATE |
| 1 | 1 | CACHE LINE INVALID |

FIG. 32

DATA PROCESSING APPARATUS AND METHOD FOR HANDLING INSTRUCTIONS TO BE EXECUTED BY PROCESSING CIRCUITRY

This application is a continuation-in-part of application Ser. No. 12/010,305 filed Jan. 23, 2008 (now U.S. Pat. No. 7,747,839 issued Jun. 29, 2010), the entire contents of which is hereby incorporated by reference.

BACKGROUND OF THE INVENTION

1. Field of the Invention

The present invention relates to a data processing apparatus and method for handling instructions to be executed by processing circuitry within the data processing apparatus.

2. Description of the Prior Art

In a typical data processing apparatus, significant power is consumed in decoding instructions prior to execution within the execution pipelines of the processing circuitry. This issue can become particularly problematic in processing circuitry that supports multiple instruction sets, since often multiple separate decoders will need to be provided for decoding instructions from the various instruction sets. By way of example, in some implementations approximately 15% of the processor power may be consumed by the instruction decoders.

It is typically the case that one or more caches are provided within the data processing apparatus for caching the instructions and data required by the processing circuitry. At any particular level in a cache hierarchy, separate instruction and data caches may be provided (often referred to as a Harvard architecture), or alternatively a unified cache may be provided for storing the instructions and data (often referred to as a Von Neumann architecture). When instructions are fetched from memory for storing in a cache, some known systems have employed pre-decoding mechanisms for performance orientated reasons. In accordance with such mechanisms, instructions are pre-decoded prior to storing in the cache, and in such cases the cache often then stores instructions in a wider format than the instructions stored in main memory, to accommodate the additional information produced by the pre-decoding process. To assist in improving performance when the instructions are later decoded and executed, the extra information provided in the pre-decoded instructions as stored in the cache has been used to identify branch instructions, identify classes of instructions (e.g. load/store instructions, coprocessor instructions, etc) to later assist multi-issue circuitry in dispatching particular instructions to particular execution pipelines, and to identify instruction boundaries in variable length instruction sets.

For example, the article "Performance Evaluation Of A Decoded Instruction Cache For Variable Instruction Length Computers", IEEE Transactions on Computers, Volume 43, number 10, pages 1140 to 1150, October 1994, by G Intrater et al., discusses the storing of pre-decoded instructions in a cache. The article "The S-1 Project: Developing High-Performance Digital Computers" by L. Curtis Widdoes, Jr., Lawrence Livermore National Laboratory, 11 Dec. 1979, describes the S1 Mark IIA computer, where a decoded instruction cache expanded the 36-bit instruction word to a 56-bit instruction cache format to reduce instruction decoding time (see also the paper "Livermore S-1 Supercomputer—A Short History" appearing on the website http://www.cs.clemson.edu/~mark/sl.html). Further, the idea of using pre-decoding mechanisms to pre-identify branches and pre-identify instruction boundaries is discussed in the AMD K5 Processor Data sheet, Publication no. 18522E-0, September 1996, Section 4.5, Innovative x86 Instruction Predecoding, page 6, which discusses adding 4 bits per instruction byte to identify start, end, opcode position, and number of Rops (RISC operations) the individual x86 instruction requires for later translation.

Whilst the above-mentioned pre-decoding mechanisms can improve the performance of the processing circuitry, they do not typically significantly alleviate the earlier mentioned power cost associated with the later decoder circuits used to decode the instructions once they are output from the instruction cache.

The processing circuitry at any point in time will be in a particular processor state, dependent on the instruction set being executed at the time. For example, an ARM processor may be able to execute instructions from either the ARM, Thumb, ThumbEE or Jazelle instruction sets developed by ARM Limited, United Kingdom, and accordingly at any point in time will be in one of four possible processor states. When pre-decoding instructions, the pre-decoding circuitry will need to assume a speculative processor state when performing the pre-decoding. The chosen speculative processor state would then typically be used for pre-decoding a whole cache line's worth of instructions. However, instructions from different instruction sets may reside on the same cache line, and accordingly such a procedure may give rise to pre-decoded instructions which are corrupted, for example if the speculative processor state is the Thumb state, but the cache line mixes ARM and Thumb instructions. Indeed, it is also possible for an entire cache line to be pre-decoded in the wrong state if the last instruction in one cache line is a state changing branch, and the next cache line is already in the pre-decode process, the pre-decoding circuitry hence making a wrong assumption of the speculative processor state when performing the pre-decoding process.

SUMMARY OF THE INVENTION

Viewed from a first aspect, the present invention provides a data processing apparatus comprising: processing circuitry for executing a sequence of instructions fetched from memory, the processing circuitry having a plurality of processor states, each processor state having a different instruction set associated therewith; pre-decoding circuitry for receiving the instructions fetched from memory and performing a pre-decoding operation to generate corresponding pre-decoded instructions; a cache for storing the pre-decoded instructions for access by the processing circuitry; the pre-decoding circuitry performing the pre-decoding operation assuming a speculative processor state, and the cache being arranged to store an indication of the speculative processor state in association with the pre-decoded instructions; the processing circuitry being arranged only to execute an instruction in the sequence using the corresponding pre-decoded instruction from the cache if a current processor state of the processing circuitry matches the indication of the speculative processor state stored in the cache in association with that corresponding pre-decoded instruction.

In accordance with the present invention, pre-decoding circuitry is used to perform a pre-decoding operation on instructions fetched from memory in order to generate corresponding pre-decoded instructions, and a cache is then provided for storing the pre-decoded instructions for access by the processing circuitry. A speculative processor state is assumed by the pre-decoding circuitry when performing the pre-decoding operation, and the cache stores an indication of that speculative processor state in association with the pre-decoded instructions. When instructions are later retrieved from the cache, the processing circuitry is arranged only to execute an instruction using the corresponding pre-decoded instruction read from the cache if a current processor state of the processing circuitry matches the indication of the speculative processor state stored in the cache for that pre-decoded instruction. Accordingly, through storing of the speculative processor state in the cache, it is possible to detect a condition where the assumption of speculative processor state by the pre-decoding circuitry was wrong, and accordingly the pre-decoded instruction read from the cache should not be used by the processing circuitry.

This provides a simple and effective, power efficient, mechanism for detecting certain situations where instructions have been corrupted by the pre-decoding process.

There are a number of ways in which the pre-decoding circuitry can select a speculative processor state when performing the pre-decoding operation. However, in one embodiment, the pre-decoding circuitry uses as the speculative processor state the processor state which the processing circuitry is in at the time the pre-decoding operation is performed.

In one embodiment, when the processing circuitry issues an access request specifying an address of an instruction in the sequence, the cache performs a lookup operation to determine whether the corresponding pre-decoded instruction is present in the cache and further to determine whether the current processor state matches the speculative processor state, the cache only detecting a hit condition if both the corresponding pre-decoded instruction is in the cache and the current processor state matches the speculative processor state stored in the cache in association with that corresponding pre-decoded instruction. Accordingly, in such embodiments, the lookup operation is modified so as to perform an additional check of the speculative processor state and the current processor state, with the hit condition only being detected if the relevant instruction is found in the cache and the current processor state matches the speculative processor state associated with that instruction in the cache.

In one embodiment, if the lookup operation identifies that the corresponding pre-decoded instruction is in the cache but the current processor state does not match the speculative processor state stored in the cache in association with that corresponding pre-decoded instruction, the cache generates a miss condition causing a linefill operation to be performed to re-fetch from the memory the instruction the subject of the access request.

Since the instruction will be re-fetched from memory, it will pass again through the pre-decoding circuitry, where this time it will be pre-decoded correctly having regard to the current processor state. Typically, the linefill operation causes a cache line's worth of instructions (including the instruction the subject of the access request) to be re-fetched from the memory. Accordingly, this entire cache line will be re-passed through the pre-decoding circuitry to generate the corresponding pre-decoded instructions, and during this re-pass through the pre-decoding circuitry the speculative processor state will match the current processor state.

Whilst such an approach ensures that the instruction the subject of the current access request from the processing circuitry will be pre-decoded correctly, it can cause a potential "thrashing" problem in situations where the cache line contains instructions from more than one instruction set. For example, if a first part of the cache line contains Thumb instructions and a second part of the cache line contains ARM instructions, with the whole cache line initially being pre-decoded assuming a Thumb processor state, then it will be appreciated that if one of the ARM instructions is accessed whilst the processing circuitry is in the ARM processor state, it will be detected that the speculative processor state (i.e. the Thumb state) does not match the current processor state (i.e. the ARM state), and accordingly the re-fetch process described above will be performed. This time, the entire cache line will be pre-decoded assuming the ARM processor state, which now provides the correct pre-decoded ARM instruction that was the subject of the access request. However, if at a later stage the processing circuitry whilst in the Thumb processor state seeks to access one of the Thumb instructions in the first part of the cache line, it will be seen that an error will again be detected, since the above re-fetch mechanism will have caused the entire cache line to be pre-decoded assuming an ARM processor state.

In order to address this problem, in one embodiment, the cache is an n-way set associative cache, and when the instruction the subject of the access request is re-fetched from the memory, the cache causes the corresponding pre-decoded instruction output by the pre-decoding circuitry to be allocated to a different way of the cache than the way storing the corresponding pre-decoded instruction that gave rise to the miss condition. Hence, rather than merely overwriting the original cache line in the cache, the newly pre-decoded version of the instructions is preferentially allocated to a different way of the cache, so as to allow both versions to co-exist in the cache. Accordingly, considering the earlier example, the same set of instructions forming a particular cache line's worth of pre-decoded instructions will be stored in one cache line as a series of pre-decoded instructions that were pre-decoded assuming the Thumb processor state, and will be stored in another cache line in a different way as a sequence of pre-decoded instructions that were pre-decoded assuming the ARM processor state.

Since the detection of a hit condition will only occur if both the instruction requested is found in the cache, and the speculative processor state matches the current processor state, it will be seen that for any particular access request issued in respect of an instruction present in both of these cache lines, only one hit condition can occur, and accordingly the fact that there are two cache lines in the cache storing instructions from the same memory addresses does not cause any problems during the lookup operation. When cleaning and invalidating the cache, the clean and invalidate operation will need to operate over multiple lines per physical address if the instruction at the physical address has been stored in multiple cache lines due to the above-described procedure.

In addition to the indication of the speculative processor state, the cache may also store one or more other items of control information, for example a valid bit identifying whether the corresponding pre-decoded instructions are valid or invalid. It is known to invalidate contents in the cache for a number of reasons, in order to avoid subsequent access to the cache contents in situations where those contents should instead be retrieved from a lower level of cache memory or from main memory.

In accordance with one embodiment of the present invention, it has been realised that space and power consumption savings in the cache can be obtained by merging this valid/invalid information with the indication of speculative processor state. In particular, the speculative processor state associated with a pre-decoded instruction is not used if that pre-decoded instruction is marked as invalid in the cache, and this fact is taken advantage of in order to provide a more efficient encoding of the speculative processor state and valid/invalid information.

More particularly, in accordance with one embodiment of the present invention the cache is further arranged to store an invalid identifier in association with the pre-decoded instructions to identify if those pre-decoded instructions are invalid. The indication of speculative processor state is stored in a multi-bit field having n possible values, the number of different speculative processor states being less than n, and the invalid identifier is encoded using one of the n possible values not used to represent a speculative processor state. Hence, in this embodiment, a pre-decoded instruction located in the cache can be assumed to be valid if the multi-bit field identifies one of the speculative processor states, and is to be considered invalid if the multi-bit field instead encodes the invalid identifier. For example, in one embodiment, the multi-bit field is a two bit field, with the values 00, 01 and 10 representing three different speculative processor states, and the value 11 indicating an invalid entry.

The cache will typically comprises a data portion having a plurality of cache lines for storing the pre-decoded instructions, and a tag portion having an entry for each cache line. Each entry in the tag portion stores an address identifier associated with the pre-decoded instructions stored in the corresponding cache line. In one embodiment, the indication of the speculative processor state used by the pre-decoding circuitry is stored in each entry of the tag portion. In this embodiment, the same speculative processor state will be associated with the entire cache line. This provides an area efficient mechanism for incorporating the speculative processor state information within the cache. It has been found that such an approach is a very efficient mechanism to use in many situations, since it is typically rare that cache lines mix instructions from different instruction sets.

The earlier mentioned valid/invalid information is typically stored within each entry of the tag portion, and hence individual cache lines are marked as valid or invalid. The above mentioned technique of merging the valid/invalid information with the indication of speculative processor state is thus particularly beneficial when the speculative processor state is stored in each entry of the tag portion. In particular, in one embodiment, the cache is further arranged to store in each entry of the tag portion an invalid identifier to identify if the pre-decoded instructions in the corresponding cache line are invalid. The indication of speculative processor state is stored in a multi-bit field within each entry of the tag portion, the multi-bit field having n possible values, the number of different speculative processor states being less than n, and the invalid identifier is encoded within the multi-bit field using one of the n possible values not used to represent a speculative processor state.

The value in the multi-bit field may be set to represent the invalid identifier at any appropriate point where the corresponding cache line is invalidated. For example, during a startup procedure of the data processing apparatus, or during performance of a cache maintenance operation, the cache may be arranged to mark the pre-decoded instructions in one or more cache lines as being invalid by storing the invalid identifier in the multi-bit field of the corresponding one or more entries in the tag portion. By this approach, the contents of individual cache lines, whole cache ways, or even of the entire cache, may be invalidated without the need to provide a separate valid field per cache line within the cache.

In one embodiment, the indication of the speculative processor state is stored in association with each pre-decoded instruction stored in the data portion. Hence, in such embodiments, the speculative processor state can be provided for each pre-decoded instruction. This clearly provides more flexibility for individually marking the speculative processor state for each pre-decoded instruction, but consumes significantly more area within the cache. As an example of use of such an embodiment, when a state changing instruction used to switch processor state is fetched from the instruction cache, the new processor state can immediately be sent to the pre-decoder to alter the speculative processor state used for instructions subsequently pre-decoded. Any instructions in the cache line that have already been pre-decoded have probably assumed a wrong speculative processor state, but any remaining instructions in the cache line should then be pre-decoded correctly. Such an approach hence reduces the number of instructions in the cache line that are pre-decoded incorrectly, thus reducing the number that need to be fixed. Once the erroneously pre-decoded instructions are fixed, they are written back to the cache so that any subsequent fetches from the cache will obtain the correctly pre-decoded instruction.

Often a state changing instruction used to trigger a change in processor state will cause a branch to a new address (and hence a different cache line) containing the first instruction to be executed in the new processor state. However, in an alternative embodiment, this may not be the case, and hence following a state changing instruction the next instruction to execute may be the next instruction in the same cache line. In such situations, a problem can arise when a fetch from the instruction cache contains more than one instruction, and one instruction in that fetch (other than the last one) is a state changing instruction. In this case a 'hit' will correctly occur for the fetch, but all instructions after the state changing instruction will have been incorrectly pre-decoded in the case where the instruction cache holds a cache line that has been pre-decoded in only one state. To address this, in one embodiment error detection circuitry is provided after the instruction cache that spots this situation, triggers a 'state error' for the sequential instructions after the state changing instruction, and initiates either a line fill or a loop back through the pre-decode process.

The cache used to store the pre-decoded instructions can take a variety of forms. For example, in one embodiment, the cache is an instruction cache used to store the pre-decoded instructions. In one particular example, the instruction cache may be provided as a level one instruction cache, and a separate level one data cache may be provided for storing the data used by the processing circuitry.

However, in an alternative embodiment, the cache is a combined instruction and data cache, each cache line of the cache storing either pre-decoded instructions generated by the pre-decoding circuitry, or data values not subjected to the pre-decode operation, and each cache line has an identifier field associated therewith for identifying whether that cache line stores pre-decoded instructions or stores data values. Cache lines containing data values will not be subjected to any pre-decoding operation, and accordingly by using such identifier fields for each cache line, it enables those cache lines which have been subjected to pre-decoding to be clearly identified. The checking of speculative processor state against current processor state can hence be restricted to accesses performed to those cache lines where the identifier field indicates pre-decoded instructions are stored.

Viewed from a second aspect, the present invention provides a method of handling instructions in a data processing apparatus, the data processing apparatus including processing circuitry for executing a sequence of instructions, the processing circuitry having a plurality of processor states, each processor state having a different instruction set associated therewith, the method comprising the steps of: retrieving instructions from memory and performing a pre-decoding operation on those instructions to generate corresponding pre-decoded instructions, a speculative processor state being assumed when performing the pre-decoding operation; and storing each pre-decoded instruction in a cache, along with an indication of the speculative processor state assumed by the pre-decoding operation when generating that pre-decoded instruction; the processing circuitry only executing an instruction in the sequence using the corresponding pre-decoded instruction from the cache if a current processor state of the processing circuitry matches the indication of the speculative processor state stored in the cache in association with that corresponding pre-decoded instruction.

Viewed from a third aspect, the present invention provides a data processing apparatus comprising: processing means for executing a sequence of instructions fetched from memory, the processing means having a plurality of processor states, each processor state having a different instruction set associated therewith; pre-decoding means for receiving the instructions fetched from memory and performing a pre-decoding operation to generate corresponding pre-decoded instructions; a cache means for storing the pre-decoded instructions for access by the processing means; the pre-decoding means for performing the pre-decoding operation assuming a speculative processor state, and the cache means being arranged to store an indication of the speculative processor state in association with the pre-decoded instructions; the processing means only executing an instruction in the sequence using the corresponding pre-decoded instruction from the cache means if a current processor state of the processing means matches the indication of the speculative processor state stored in the cache means in association with that corresponding pre-decoded instruction.

BRIEF DESCRIPTION OF THE DRAWINGS

The present invention will be described further, by way of example only, with reference to embodiments as illustrated in the accompanying drawings, in which:

FIG. 9 illustrates the format of two example instructions after pre-decoding in accordance with one embodiment;

FIG. 10 is a table listing situations where pre-decoding errors may or may not occur;

FIG. 12 illustrates the use of an incomplete field within a pre-decoded Thumb 32 instruction in accordance with one embodiment;

FIG. 15 illustrates the format of two example instructions after pre-decoding in accordance with one embodiment;

FIG. 25 illustrates how different portions of an ARM instruction may be pre-decoded into a pre-decoded instruction having a shared format with Thumb32 instructions;

FIG. 26 illustrates how a Thumb32 and an ARM instruction can respectively be pre-decoded into pre-decoded instructions having a shared format to represent shared functionality;

FIG. 27 illustrates how an ARM instruction may be pre-decoded into a pre-decoded instruction corresponding to an unused portion within the Thumb32 instruction bitspace;

FIG. 32 illustrates an encoding of speculative processor state employed in one embodiment in order to allow an invalid identifier to additionally be encoded.

DESCRIPTION OF EMBODIMENTS

Figure 1:
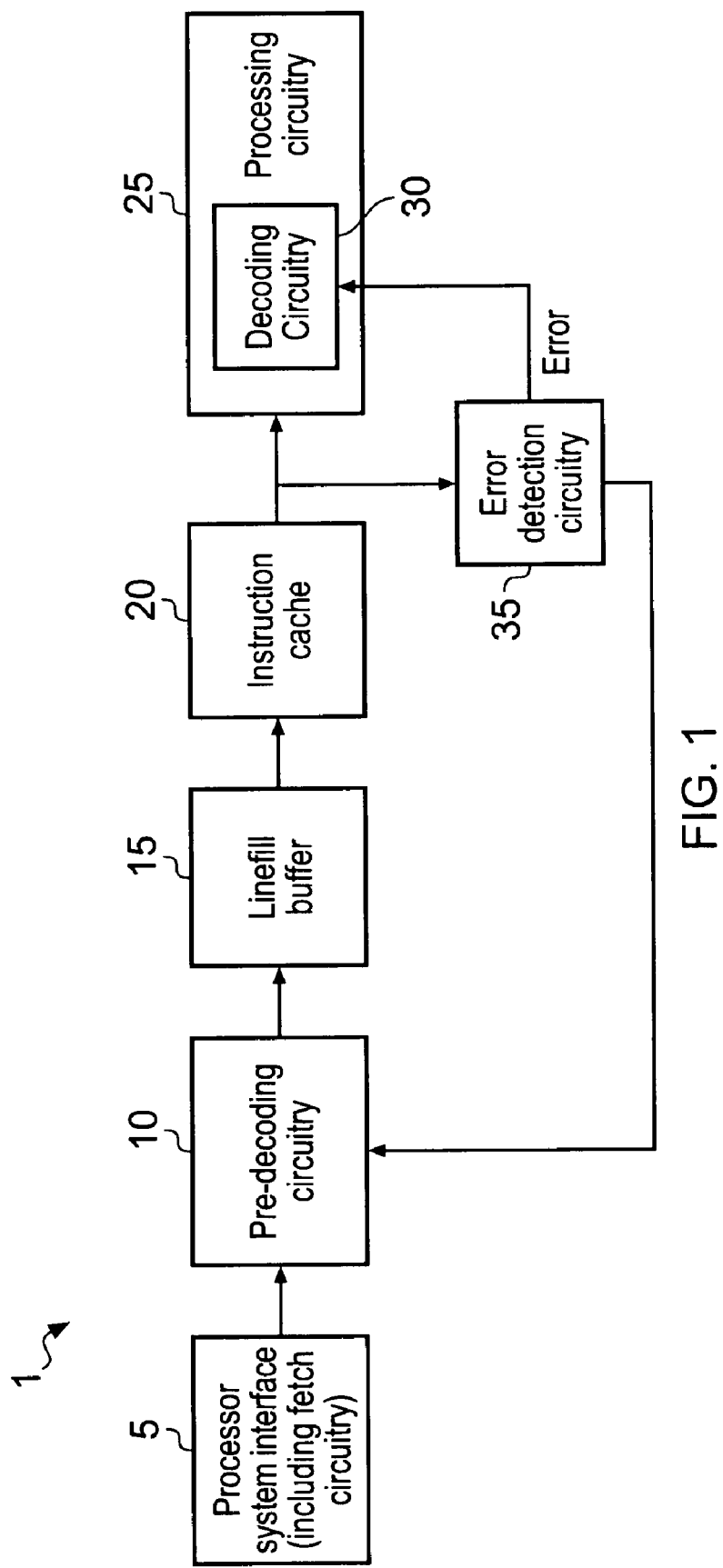
FIG. 1 schematically illustrates a data processing apparatus according to one embodiment.

FIG. 1 schematically illustrates a data processing system 1 according to one embodiment. The data processing system 1 includes a processor system interface 5 which contains instruction fetching circuitry for fetching data representing program instructions from memory (not shown). The processor system interface 5 passes instructions fetched from memory to pre-decoding circuitry 10. The pre-decoding circuitry 10 performs pre-decoding operations on the instructions to generate pre-decoded instructions, which are passed to a line-fill buffer 15 and stored in an instruction cache 20. Instructions stored in the instruction cache 20 are executed by processing circuitry 25. The processing circuitry 25 includes decoding circuitry 30 for generating control signals from the pre-decoded instructions which control the processing circuitry so as to perform processing operations. The error detection circuitry 35 is employed to detect certain errors occurring in the pre-decoded instructions and to cause the relevant instructions, or the cache lines containing those instructions, to be re-passed through the pre-decoding circuitry 10 (either directly or via initiation of a linefill operation) before being supplied to the processing circuitry 25. In the event such errors are detected, an error signal is sent from the error detection circuitry 35 to the processing circuitry 25 to cause the decoding circuitry 30 to cease any decoding that may have begun in respect of such pre-decoded instructions for which an error has been detected, the processing circuitry 25 instead awaiting the pre-decoded instruction obtained by the re-pass through the pre-decoding circuitry 10.

Pre-decoding instructions before storing them in an instruction cache is a technique that has previously been implemented to enhance the performance of a data processing apparatus. However the performance benefit of pre-decoding instructions in this manner generally comes at the cost of greater power consumption when later fetching those instructions from the instruction cache for execution, due to the greater length of the pre-decoded instruction resulting from the pre-decoding operation. However, since fetching cache lines from main memory is usually a rare event compared with fetching from the instruction cache, it has been realised that a pre-decoder would normally operate far less on a given instruction than the later decoder and thus the potential existed for a power saving in the data processing apparatus to be achieved. Yet it was also realised that it would only be possible to reduce overall power consumption if one could identify a feature of an instruction for which the power consumed by accessing a wider instruction cache is outweighed by the power saving made by not having to decode that feature after the instruction cache.

As stated above instruction pre-decoding is generally implemented as a performance-enhancing technique and the added power consumption is viewed as a price worth paying for the performance benefit. However, it has been found that the decoding circuitry required for the identification of abnormal instructions in the decode stage after the instruction cache could contribute significantly to the total gate count of the decoder. This is even more significant in a secure data processing apparatus since abnormal instructions must be decoded in a consistent, deterministic way so that no matter what condition the processor is in and no matter what instructions it has recently executed it will always behave in the same way with a specific abnormal instruction. Because abnormal instructions must be decoded in a consistent, deterministic way, more gates must be put into the decoder to deal with corner cases in the instruction set architecture. By shifting this identification to the pre-decode stage and providing an abnormal instruction identifier in association with the pre-decoded instruction, it has been found that the added power consumption of this arrangement was outweighed by the power saving of not having to identify abnormal instructions at the decode stage.

Figure 2:
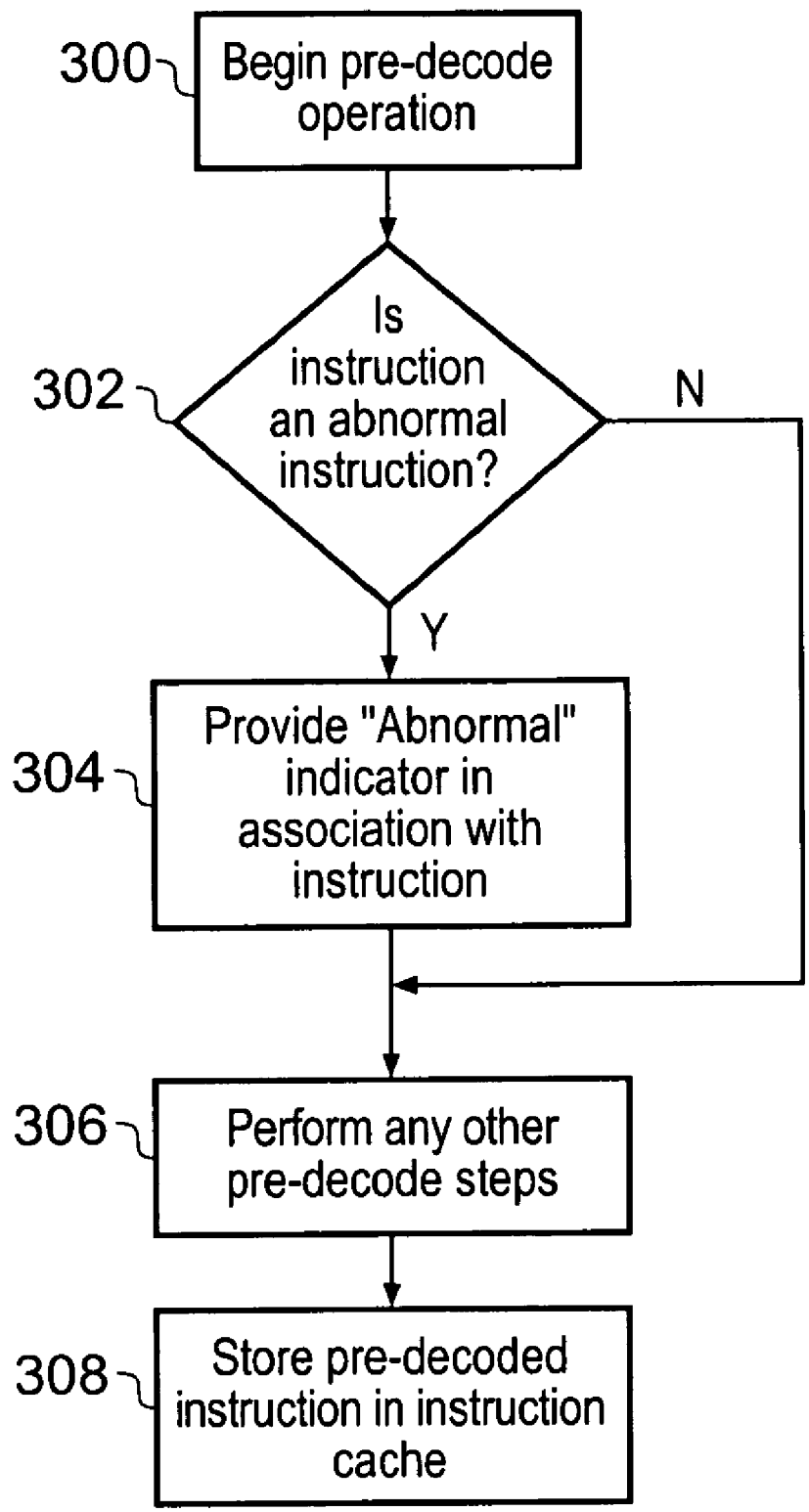
FIG. 2 is a flow diagram illustrating a series of steps carried out by a data processing apparatus according to one embodiment.

FIG. 2 schematically illustrates a series of steps carried out by data processing apparatus 1 when performing a pre-decode operation in accordance with one embodiment. The flow begins at step 300 within pre-decoding circuitry 10, an instruction having been retrieved from memory (via the processor system interface 5). At step 302 it is established if the instruction is abnormal or not. In one embodiment an abnormal instruction is defined to be one that is either undefined or unpredictable. An undefined instruction is one that is within the instruction space, yet not part of the instruction set. There can clearly be a great number of such undefined instructions, since in a 32-bit (for example) instruction space there are $2^{32}$ (over 4 billion) possible encodings. On the other hand, an unpredictable instruction is one which is a defined instruction, yet is being used in a manner such that it will not result in a well-defined outcome in the data processing apparatus, for example a load or store instruction which attempts to perform a base register writeback with the base set to the program counter register.

If the instruction is identified as abnormal, then at step 304 pre-decoding circuitry 10 provides an identifier identifying that instruction as abnormal. This identifier is associated with the pre-decoded instruction that the pre-decoding circuitry 10 generates, in one embodiment side band bits in the pre-decoded instruction serving as the identifier.

If however at step 302 the instruction is identified as not being abnormal, then step 304 is omitted. The flow proceeds to step 306 where pre-decoding circuitry 10 performs any other pre-decode steps that are required (examples of other pre-decode steps are given later in the description). Finally, at step 308 the pre-decoded instruction is stored in instruction cache 20 (via linefill buffer 15).

Figure 3:
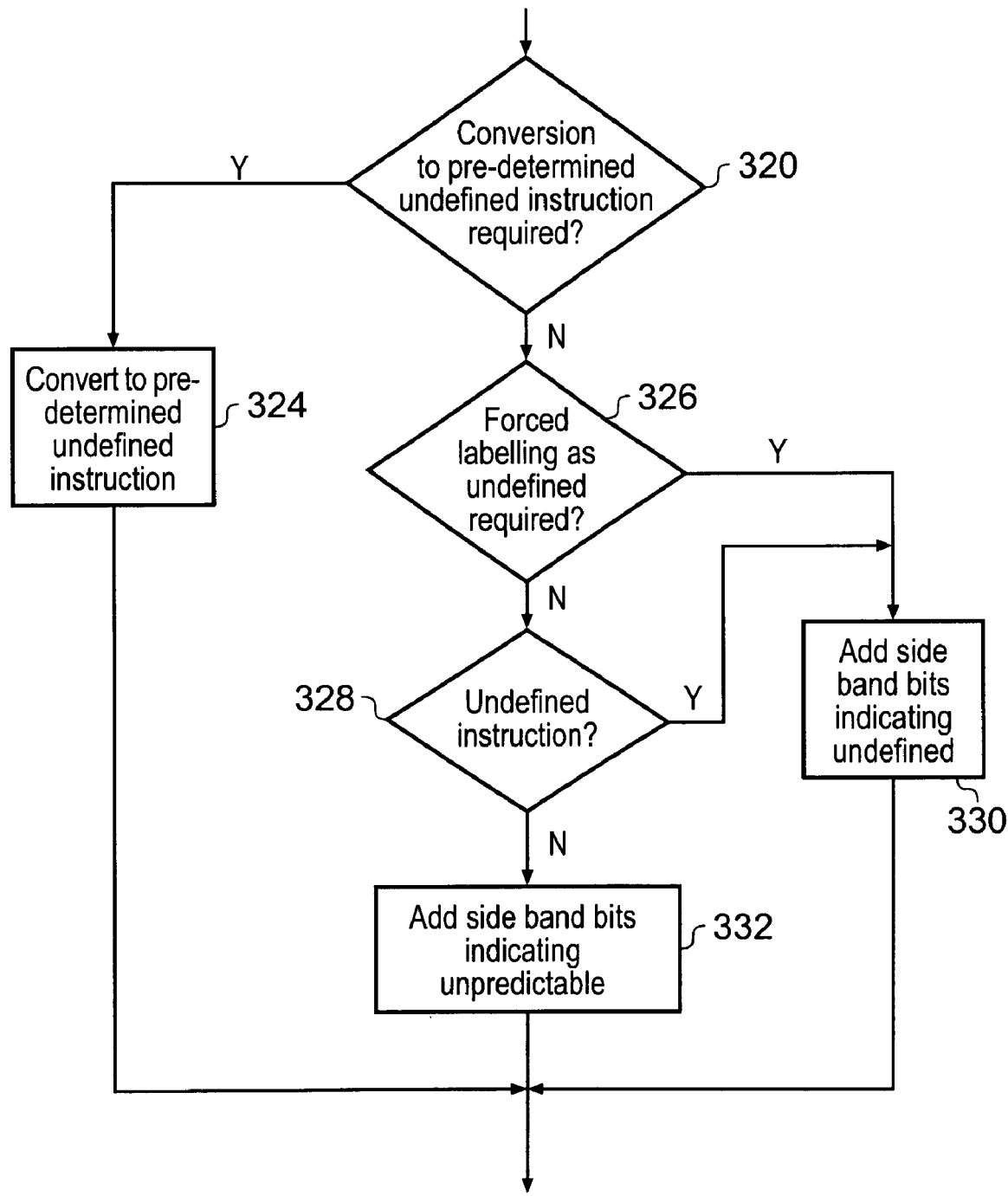
FIG. 3 is a flow diagram illustrating in more detail a series of steps carried out by pre-decoding circuitry when providing an abnormal indicator.

FIG. 3 schematically illustrates in more detail a series of steps carried out in one embodiment by pre-decoding circuitry 10 in step 304 of FIG. 2. Firstly, at step 320 it is checked if the pre-decoding circuitry 10 is currently configured to convert all abnormal instructions into a predetermined undefined instruction. If so, then the flow proceeds to step 324, where this conversion takes place. In embodiments of the present invention in which the pre-decoding circuitry is configured to do this, this allows the mechanism for handling abnormal instructions in the processing circuitry to be particularly simple, since only one particular undefined instruction will ever be received by the processing circuitry, and its response (for example to call a dedicated exception routine) is then well-defined and predictable for all abnormal instructions. From step 324, the flow continues to step 306 in FIG. 2. Hence in this embodiment, the use of the pre-determined undefined instruction itself provides the "indicator" of the abnormal instruction.

Otherwise the flow proceeds to step 326 where it is checked if the pre-decoding circuitry 10 is currently configured to label all abnormal instructions as undefined. This configuration of pre-decoding circuitry 10 also simplifies the downstream mechanisms for handling abnormal instructions, since all abnormal instructions are then handled as if they are undefined instructions and the processing circuitry's response is then well-defined and predictable for all abnormal instructions (for example, such instructions could trigger an exception, or alternatively could be NOP (no-operation) handled, passing through the processing circuitry without having any effect on the internal state of the processing circuitry as a result). If all abnormal instructions should be labelled as undefined, then the flow proceeds to step 330, where the corresponding indicator is generated, in this case adding side band bits to the pre-decoded instruction indicating that the instruction is undefined.

If the pre-decoding circuitry 10 is not currently configured to label all abnormal instructions as undefined, then the flow proceeds to step 328, where it is checked if the identified abnormal instruction is an undefined instruction. If so, the flow proceeds to step 330 and side band bits are added to the pre-decoded instruction indicating that the instruction is undefined. If the abnormal instruction is not undefined, then in this embodiment it must be unpredictable, and at step 332 side band bits are added to the pre-decoded instruction indicating that the instruction is unpredictable. All paths through FIG. 3 finally merge to proceed to step 306 in FIG. 2.

Figure 4:
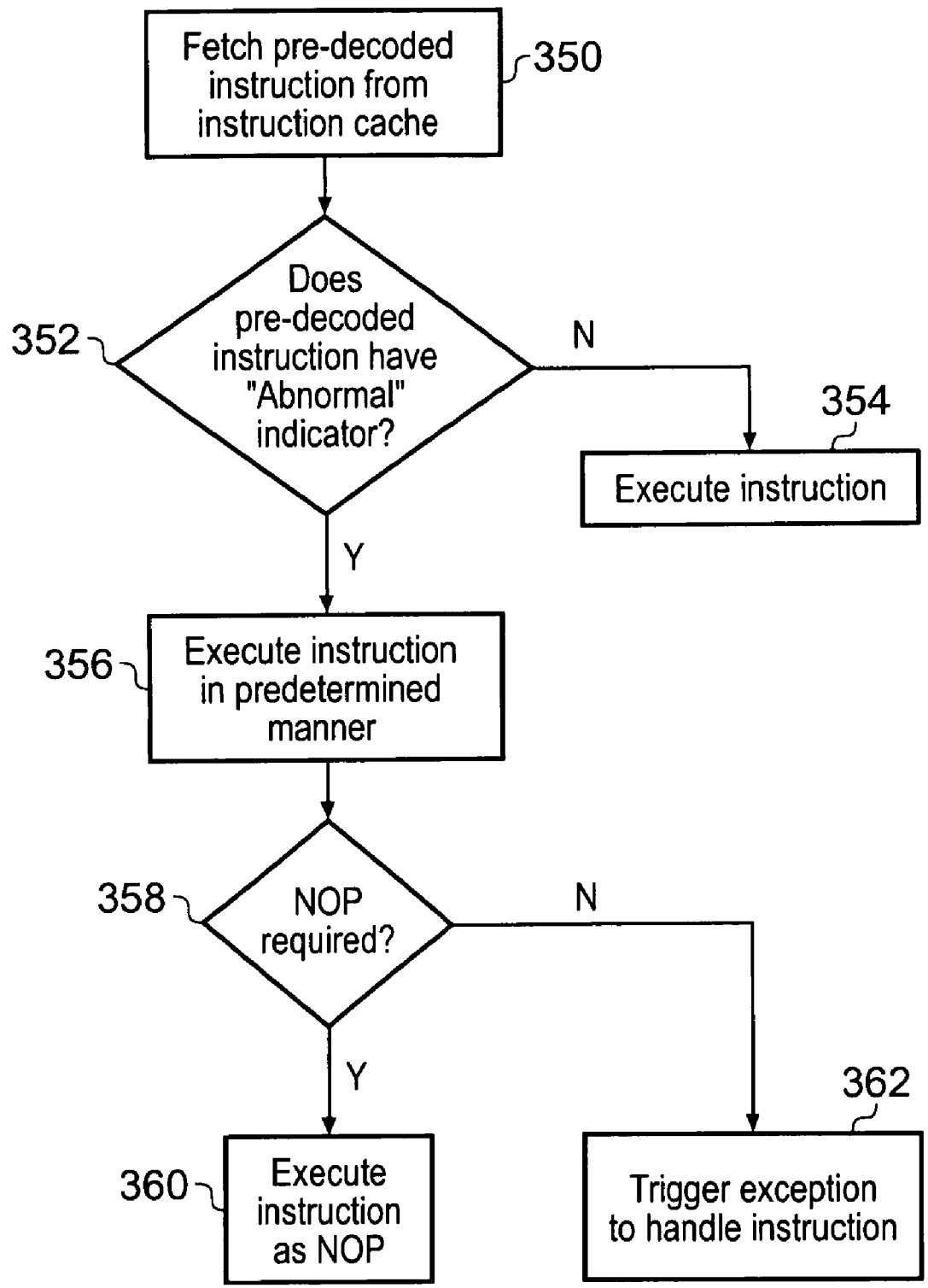
FIG. 4 is a flow diagram illustrating a series of steps carried out by processing circuitry when fetching and executing instructions.

FIG. 4 illustrates a series of steps carried out by processing circuitry 25 when fetching and executing instructions that may have an associated indicator labelling the pre-decoded instruction as abnormal. At step 350 a pre-decoded instruction is fetched from the instruction cache 20 into the processing circuitry 25.

Next, at step 352 the pre-decoded instruction is examined to establish if it has been labelled as abnormal, by means of an associated indicator. If the pre-decoded instruction is not so labelled as abnormal, then at step 354 normal execution (preceded by further decoding by decoding circuitry 30 as necessary) of the instruction is carried out.

On the other hand, if the instruction is abnormal then the processing circuitry 25 executes the instruction in a predetermined manner (step 356). In this embodiment the processing circuitry is configured to do this in one of two ways. Firstly, at step 358, if the processing circuitry is configured to NOP the instruction, then at step 360 the instruction is executed as NOP, passing through the processing circuitry without any state of the processing circuitry changing as a result. Alternatively, if the processing circuitry is configured to trigger an exception in response to an abnormal instruction, then at step 362 a suitable exception is called.

Hence, according to the above described embodiment, a data processing apparatus is provided in which power savings may be made by identifying abnormal instructions at a pre-decode stage. By generating an identifier showing that an instruction is abnormal, when the pre-decoded instruction is later retrieved from an instruction cache, the processing circuitry may more swiftly handle the abnormal instruction. Furthermore, the early identification of abnormal instructions enables the provision of a data processing apparatus which responds in a predictable and well-defined manner to instructions which could otherwise jeopardise the operation and security of the device.

Figure 5:
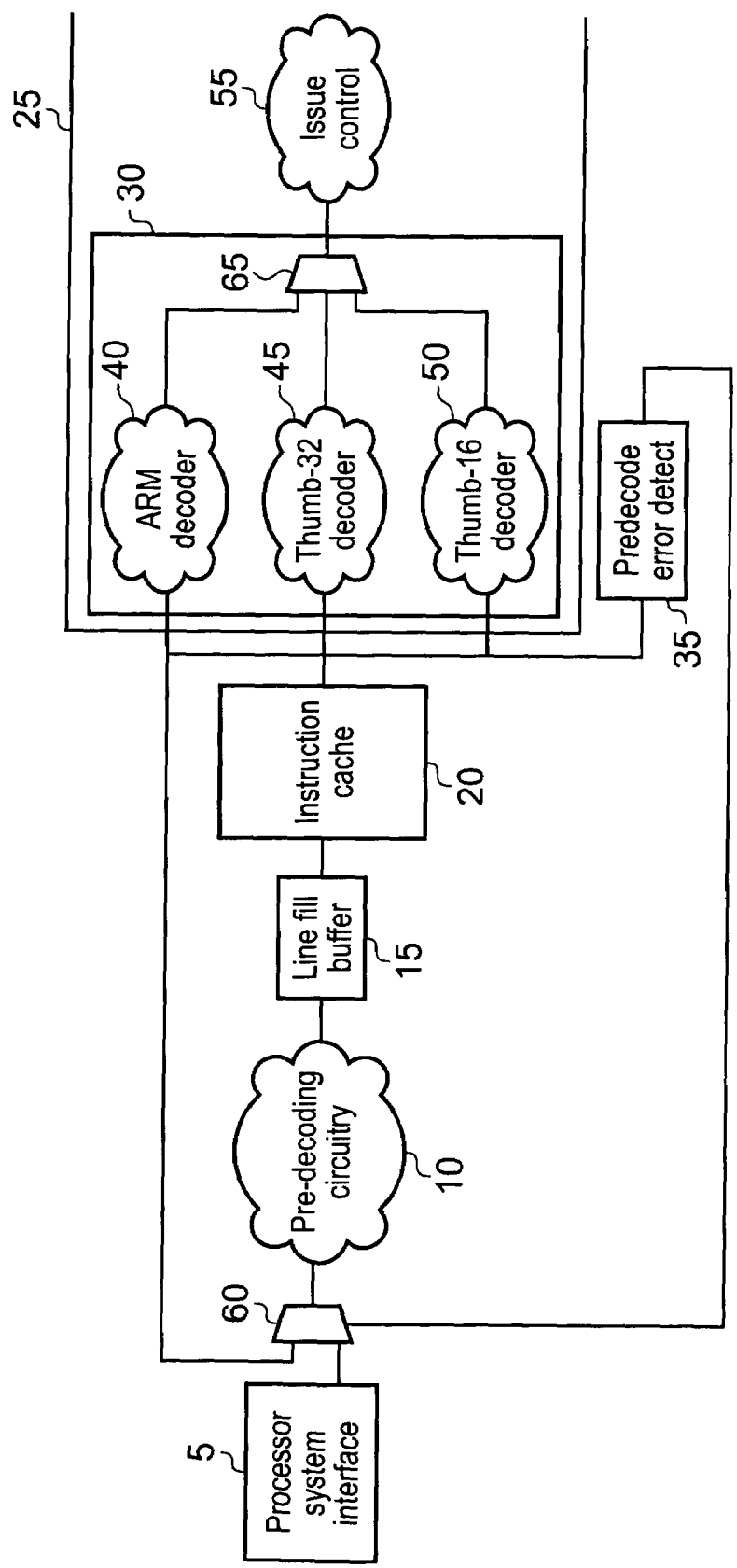
FIG. 5 illustrates one particular example embodiment of the data processing apparatus.

The data processing system 1 processes instructions from one or more instruction sets. For example, some processors produced by ARM Limited of Cambridge may execute instructions from the ARM instruction set, as well as from the mixed-length Thumb 2 instruction set. Thumb 2 instructions may be 16 bits or 32 bits long. Thus, the decoding circuitry 30 can include decoders for each set of instructions. FIG. 5 shows an example of the data processing apparatus 1 in which the decoding circuitry 30 includes an ARM decoder 40, a Thumb-32 decoder 45 and a Thumb-16 decoder 50. The decoders 40, 45, 50 are used to decode pre-decoded instructions stored in the instruction cache 20. The decoders 40, 45, 50 generate control signals from the pre-decoded instructions which control the processing circuitry so as to perform processing operations. A multiplexer 65 selects which of the decoders 40, 45, 50 is used depending on the processor state.

Figure 6:
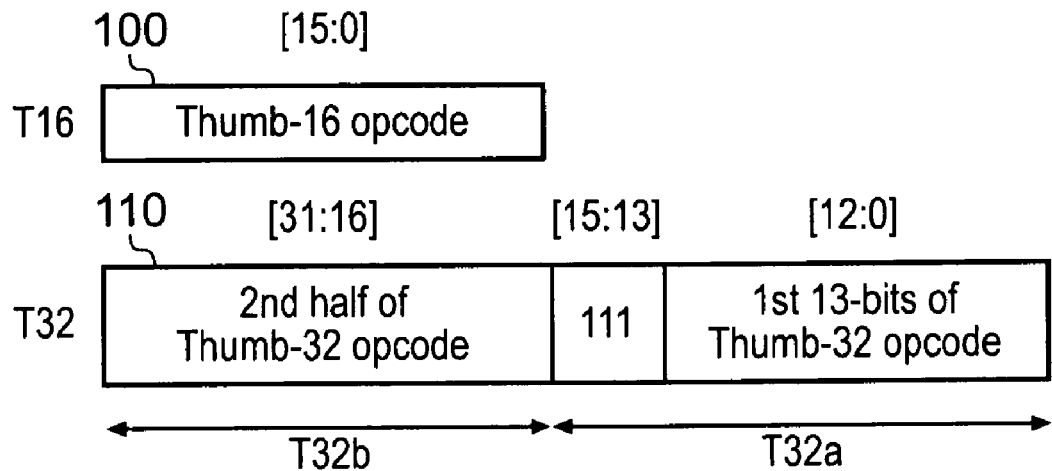
FIG. 6 illustrates two instruction formats prior to pre-decoding taking place.

FIG. 6 shows a Thumb-16 (T16) instruction 100 and a Thumb-32 (T32) instruction 110 before they are pre-decoded. A T16 instruction 100 consists of a 16-bit opcode (including all fields). A T32 instruction 110 consists of two portions. The first portion T32a consists of 16-bits. Bits [15:13] in the first portion T32a of a T32 instruction 110 are set to 0b111. Bits [12:0] of the first portion T32a store the first 13 bits of the T32 opcode. The second portion T32b of a T32 instruction 110 contains 16 bits which comprise the second half of the T32 opcode. For T16 and T32 instructions, the two portions of the T32 are the same length as each other, and the same length as a T16. However, this is not necessarily the case for all mixed-length instruction sets.

Figure 7:
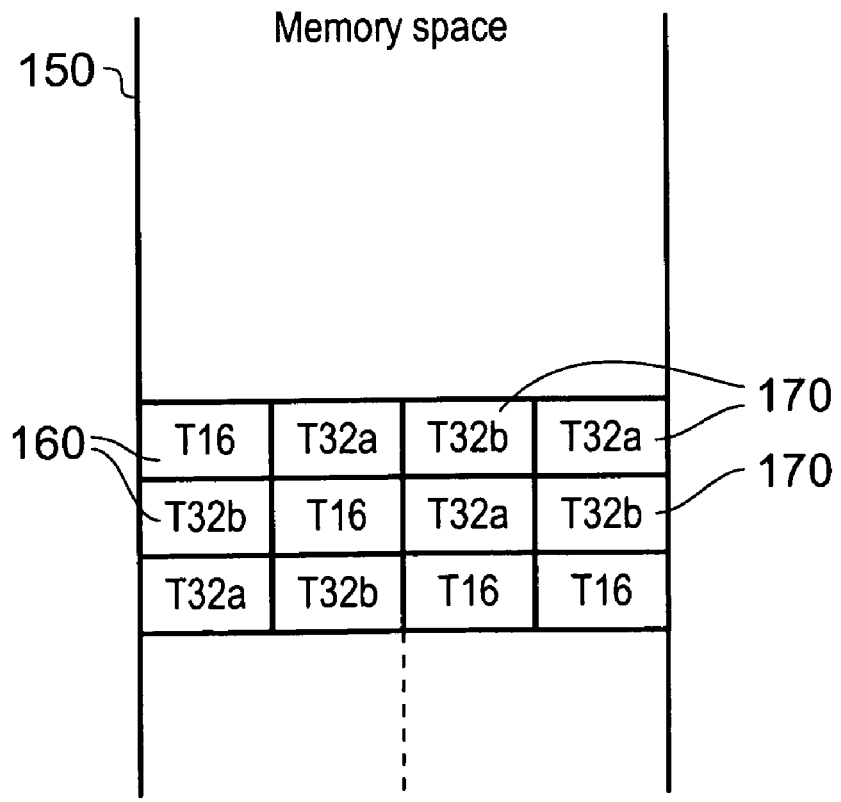
FIG. 7 illustrates how data representing program instructions can be stored in memory space.

FIG. 7 shows how data representing program instructions can be stored in the memory space 150. Data is arranged in blocks 170, each block representing a portion of a program instruction. For example, each block may represent a T16 instruction, the first portion T32a of a T32 instruction or the second portion T32b of a T32 instruction. Blocks are arranged in cache lines 160. For simplicity, in FIG. 7 a cache line 160 is depicted as containing four blocks, but it will be appreciated that a cache line 160 can store other (typically large) numbers of blocks 170. A T32 instruction may span the boundary between two cache lines 160, so that the last block of one cache line represents T32a and the first block of the following cache line represents T32b.

When a program is executed, the processing circuitry executes instructions stored in the instruction cache 20 if possible. If an instruction is not present in the instruction cache 20, then a cache miss occurs and blocks of data representing the instruction are fetched from memory. The fetching circuitry within the processor system interface 5 fetches a cache line 160 including the block or blocks representing the desired instruction from memory. The fetched blocks are pre-decoded by the pre-decoding circuitry 10 before being placed in the instruction cache 20 ready for further decoding. However, when blocks are fetched, the pre-decoding circuitry 10 cannot determine with certainty which portion of an instruction a block represents. Thus, the pre-decoding circuitry 10 makes a speculative identification of which portion of an instruction a fetched block represents.

The instruction blocks may have some bits which give an indication of which portion a block is likely to represent. For example, with the mixed-length Thumb2 instructions a block representing the first portion T32a of a T32 instruction will have bits [15:13] set to 0b111. A pre-decoding operation is performed on a block, depending on the identification made by the pre-decoding circuitry 10. For example, an abnormal instruction identifier may be added to the block indicating whether or not the block is an abnormal instruction. However the same bit pattern could potentially also arise for the second portion T32b of a T32 instruction, depending on the value of the opcode for that instruction. Thus, the speculative identification may be incorrect. If an incorrect identification of a block is made, then the pre-decoding circuitry 10 may perform the wrong pre-decoding operation on that block, resulting in a pre-decoding error.

Figure 8A:
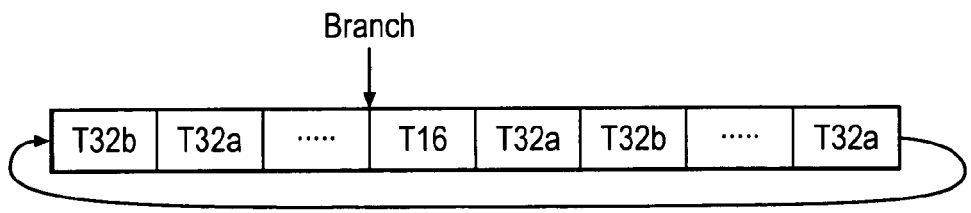
FIGS. 8A to 8D illustrate several possible situations in which pre-decoding errors could arise.

FIGS. 8A to 8D illustrate several possible situations in which errors could arise. FIG. 8A shows an error which can occur when the processor branches into the middle of a cache line. If a cache miss occurs, the processor system interface fetches the cache line from memory. The pre-decoding circuitry 10 starts pre-decoding from the point at which the program branches to so that the processor may unstall as soon as possible. The pre-decoding circuitry 10 then continues pre-decoding blocks up to the end of the cache line. The pre-decoding circuitry 10 then returns to the beginning of the cache line, makes a speculative identification of which portion the first block in the cache line represents, and pre-decodes the remaining blocks in the cache line. The speculative identification of the first block in the cache line may be incorrect, causing a pre-decoding error. For example, in FIG.

8A, the first block of in the cache line, which actually represents a T32*b* portion, could be mistakenly identified as a T32*a* portion or a T16 portion, depending on the value of bits [15:13] of the block.

Figure 8B:
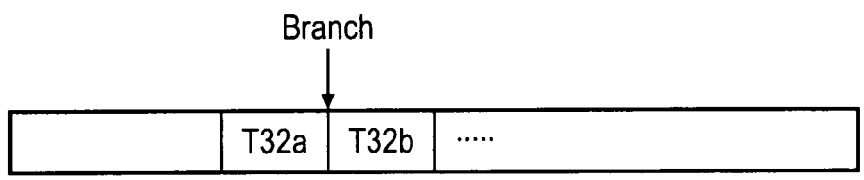

Another type of error can occur when a branch misprediction occurs, causing the program flow to branch into the middle of a T32 instruction by mistake, as illustrated in FIG. 8B. In this case the pre-decoding circuitry 10 may incorrectly identify the following T32*b* portion as a T16 instruction or as a T32*a*. Subsequent blocks may also be misidentified. For example, if the block at the branch point, which actually represents a T32*b* portion, is mistakenly identified as a T32*a*, then the following block will be identified as a T32*b*. This could cause further errors.

Figure 8C:
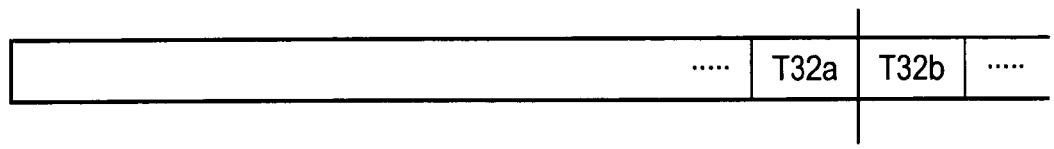

If a T32 instruction spans a cache line boundary, as illustrated in FIG. 8C, an error may occur when the pre-decoding circuitry 10 decodes the second cache line. The T32*b* portion may be identified as a T16 instruction or as a T32*a*.

Figure 8D:
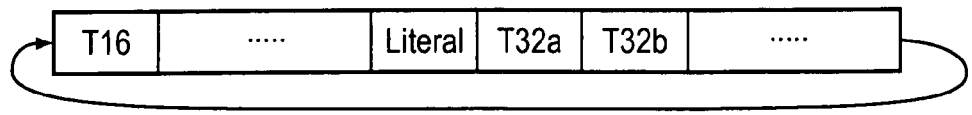

FIG. 8D illustrates an error which may occur if the cache line contains data which does not represent a program instruction (a literal). In this case the pre-decoding circuitry 10 may interpret the literal as an instruction portion. This may cause a knock on effect in the identification of subsequent blocks. For example, if the pre-decoding circuitry 10 identifies the literal as a T32*a* portion, it will pre-decode the following block as a T32*b* portion of the T32 instruction.

Thus, there are several situations in which pre-decoding errors may arise. Therefore, in embodiments the data processing system 1 is provided with error detection circuitry 35 which can detect if the speculative identification made by the pre-decoding circuitry 10 was or was not correct and if not, signal a pre-decoding error and correct the error instructions in the cache 20. Pre-decoding errors may be corrected by sending at least part of pre-decoded instructions for which errors have been detected back to the pre-decoding circuitry 10 to be pre-decoded again. In some situations the pre-decoding circuitry 10 may be able to regenerate the original instruction blocks from the pre-decoded blocks. An alternative method of correcting errors is to invalidate a cache line in the cache 20 which contains an error and cause the cache line to be re-fetched from memory and pre-decoded again.

In order for the error detecting circuitry to be able to detect as which portion the pre-decoding circuitry 10 speculatively identified a block, the pre-decoding circuitry marks each block with an instruction portion identifier that indicates as which portion the block has been identified. The instruction portion identifier is added to a block as one or more additional bits.

In one embodiment, the pre-decoding operation is performed in order to add an abnormal instruction identifier to a T32 instruction indicating whether or not the instruction is abnormal or not. This abnormal instruction identifier is added to the first portion T32*a* of the T32 instruction in the form of sideband information. In this embodiment, no sideband information is added to the second portion T32*b* of the T32 instruction or the T16 instruction.

Thus, the T16 opcode and the second half of the T32 opcode are unmodified by the pre-decoding circuitry 10. This means that it does not matter if the pre-decoding circuitry 10 mistakenly identifies a block representing a T16 instruction as the second portion T32*b* of a T32 instruction, because the opcode will be unmodified and so the block stored in the instruction cache 20 will be the same regardless of the identification made. Similarly, it does not matter if the pre-decoding circuitry 10 identifies a block which actually represents a T32*b* as a T16. Again, no pre-decoding error will arise from an incorrect identification. This means that the number of pre-decoding errors which occur can be reduced. If fewer pre-decoding errors occur, then the error detection circuitry 35 needs to correct fewer errors and the pre-decoding circuitry 10 does not need to pre-decode as many instructions more than once. Thus, the power consumed by the data processing system 1 will be reduced.

As it does not matter whether a block is identified as a T16 or a T32*b*, the pre-decoding circuitry 10 adds the same instruction portion identifier to a block for each case. Thus, the instruction portion identifier needs only to identify whether or not a block represents the first portion T32*a* of a T32 instruction. This means only one bit is required for the instruction portion identifier, and so the instruction does not need to be unduly extended. This means less power is consumed in storing pre-decoded instructions in the cache 20. In one embodiment, the instruction portion identifier is set to "1" when a block is identified as representing a T32*a*, and set to "0" when a block represents either a T32*b* or a T16 instruction.

FIG. 9 shows the format of the T16 and T32 instructions after pre-decoding in one example embodiment. If a block is identified as representing the first portion T32*a* of a T32 instruction, the pre-decoding circuitry 10 adds an instruction portion identifier (ID bit) at bit [16] and sets the instruction portion identifier to "1". Sideband information is inserted indicating whether or not the instruction is an abnormal instruction. Since the instruction portion identifier at bit [16] now indicates that the block represents a T32*a* portion of a T32 instruction, bits [15:13] are redundant for identifying the block. Thus, sideband information can be inserted into these bits without loss of information. One way of doing this is do insert sideband bits in bits [15:14] of the T32*a* portion, one bit indicating whether or not the instruction is undefined and one bit indicating whether or not the instruction is unpredictable. Thus, sideband information may be added to the block without extending the length of the block, reducing the power consumed in storing the instructions in the cache 20.

As sideband information for a T32 instruction is only added to the first portion T32*a* of the instruction, this allows the pre-decoding operation performed on the second portion T32*b* to be the same as for a T16 instruction, so that the number of errors which occur can be reduced. If a block is identified as representing a T16 instruction, the pre-decoding circuitry 10 adds an instruction portion identifier (ID bit) at bit [16] and sets the instruction portion identifier to 0. The T16 opcode in bits [15:0] is not modified. If a block is identified as representing the second portion of a T32 instruction, then the same pre-decoding operation is performed on the block as for a T16 instruction. Bit [33] of the T32 instruction (corresponding to bit [16] of the block representing the second portion T32*b* of the T32 instruction) is set to 0. The remainder of the second half of the T32 opcode is not modified.

Thus, the pre-decoding circuitry does not need to detect errors when a T16 has been identified as a T32*b* or vice versa, and so has fewer errors to detect. The only errors which need to be detected are when a T32*b* portion is incorrectly speculatively identified as a T32*a* portion, when two consecutive blocks are marked as a T32*a* portion (this may occur when a T32 instruction spans a cache line boundary), or when a T32*a* portion is mistakenly identified as a T32*b* portion (caused by a knock on effect from a mis-identification of a previous block). FIG. 10 shows a table listing the situations in which errors may or may not occur. The column Native Instruction Stream shows which portion a sequence of blocks in a cache line actually represent. The column Pre-decode Speculation shows as which portion the pre-decoding circuitry has speculatively identified the blocks. Some pre-decoding errors may occur when a branch mispredict occurs causing the program flow to branch into the middle of a T32 instruction. Other errors may occur when the flow continues from a previous cache line.

It will be appreciated that the present technique is not restricted to instructions within the Thumb2 instruction set, but is applicable to instructions from any variable-length instruction set, or to instructions from instruction sets of differing lengths. The present technique can be implemented by ensuring that for at least one portion of an instruction from a first set of instructions and at least one portion of an instruction from a second set of instructions the pre-decoding operation performed on a block is the same regardless of as which of the portions the pre-decoding circuitry 10 identifies the block. Thus, the power consumed by the system can be reduced.

Figure 11:
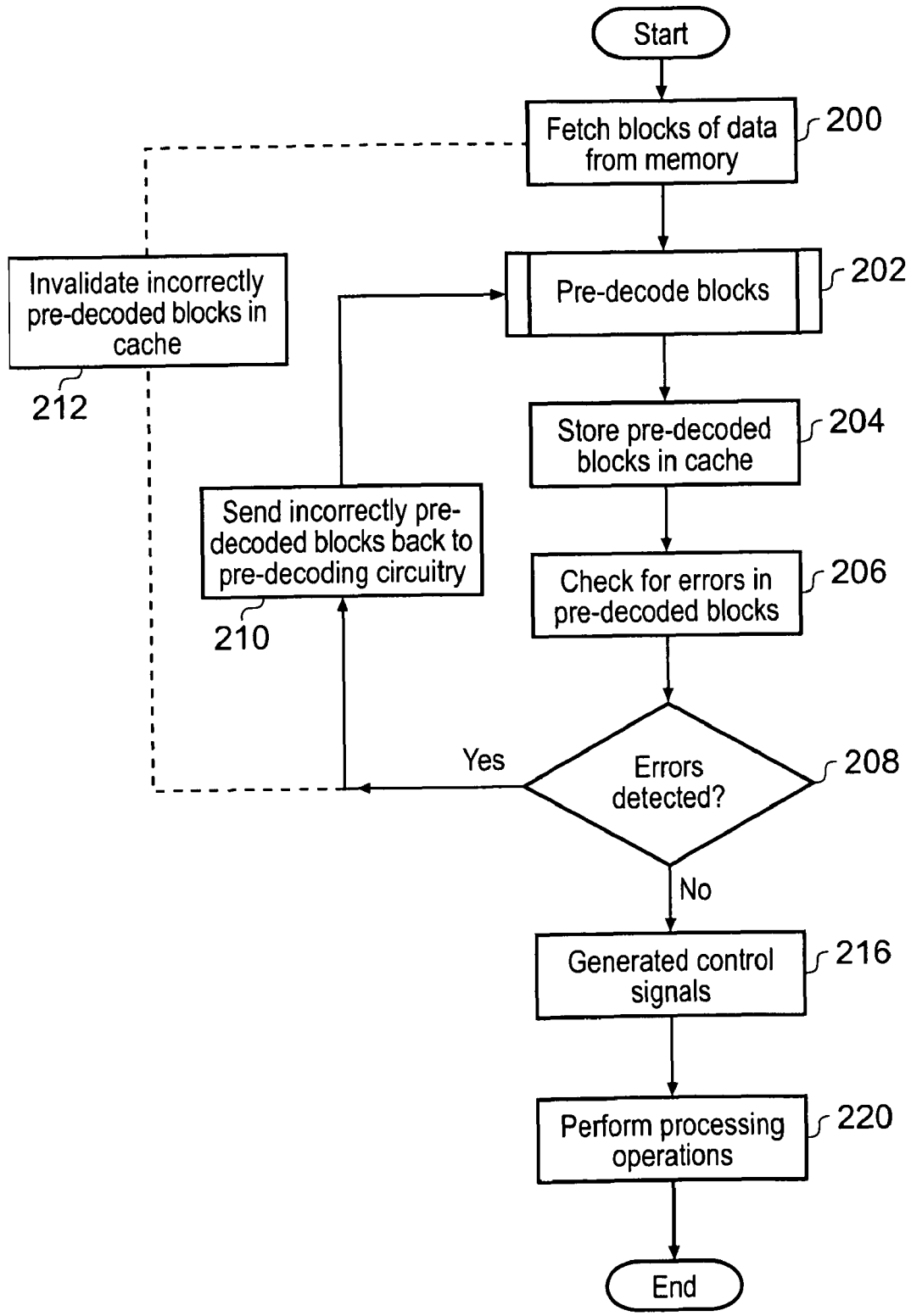
FIG. 11 is a flow diagram illustrating the operation of the data processing system in some embodiments.

FIG. 11 shows a flow chart illustrating the operation of the data processing system 1 in some embodiments. Firstly, in step 200, the instruction fetch circuitry within the processor system interface 5 fetches a cache line from memory comprising a plurality of blocks of data representing program instructions. Next, in step 202 the blocks of data are passed to the pre-decoding circuitry 10, which pre-decodes the blocks by performing pre-decoding operations on the blocks and generates pre-decoded blocks. The pre-decoding operations will be described in more detail with reference to FIG. 15. In step 204 pre-decoded instructions made up of pre-decoded blocks are stored in the instruction cache 20. Subsequently, in step 206 the error detection circuitry 35 checks for errors in the pre-decoded blocks stored in the cache 20. In step 208 the error detection circuitry 35 identifies whether or not any pre-decoding errors have been detected.

If the error detection circuitry 35 identifies in step 208 that a pre-decoding error has been detected, the error detection circuitry 35 acts to correct the pre-decoding error. In one embodiment, the error detection circuitry 35 in step 210 sends at least part of any incorrectly pre-decoded blocks back to the pre-decoding circuitry 10. Flow then returns to step 202, in which the pre-decoding circuitry again pre-decodes the incorrectly pre-decoded blocks.

As an alternative to step 210, the error detection circuitry 35 may instead perform step 212. In step 212, the error detection circuitry 35 invalidates the cache line in the instruction cache 20, which contains the incorrectly pre-decoded instruction. Flow then returns to step 200, in which the cache line containing the incorrectly pre-decoded instruction is re-fetched from memory.

If, on the other hand, the error detection circuitry 35 identifies in step 208 that no errors have been detected, flow passes to step 216. In step 216, the decoding circuitry 30 within the processing circuitry 25 decodes the pre-decoded instructions and generates control signals. Next, in step 220 the processing circuitry performs processing operations in response to the control signals. The process then comes to an end.

Another pre-decode error that can occur, and hence should be identified, is when a Thumb-32 instruction crosses a cache line boundary, and the second half-word is not available to the pre-decoding circuitry at the time the pre-decoding operation is performed. In normal operation, the pre-decoder can correctly pre-decode a Thumb-32 instruction that crosses a cache line boundary providing it has the first half-word from the previous cache line and the second half-word from the new cache line. However, when a Thumb-32 instruction crosses a cache line boundary and the new cache line has not been fetched at the time the pre-decoding operation is being performed, the pre-decoding operation will be incomplete and accordingly the sideband signals will not be pre-decoded correctly.

In order to enable the processing circuitry to later determine, when reading a pre-decoded instruction from the instruction cache, that the pre-decoding operation was incomplete, in one embodiment an incomplete field is added to the pre-decoded instruction to form an incomplete pre-decode identifier, this field being set if the pre-decoding circuitry does not have access to both portions of the Thumb-32 instruction when performing the pre-decoding operation, and in one particular embodiment the pre-decoded Thumb-32 instruction can be represented as shown in FIG. 12. In particular, when comparing FIG. 12 with the earlier-discussed FIG. 9, it will be seen that each pre-decoded instruction portion has been extended from 17 to 18 bits, so that bits 0 to 17 represent the first pre-decoded instruction portion, and bits 18 to 35 represent the second pre-decoded instruction portion. Bits 0 to 16 of the first pre-decoded instruction portion are the same as in the earlier discussed FIG. 9, with the sideband signals (identifying the presence of an abnormal instruction) being inserted in bit positions 14 and 15, and with the instruction portion identifier being inserted at bit position 16. Further, bit position 17 is used to provide the incomplete field, this bit being set if the pre-decoding circuitry did not have access to the second half of the Thumb-32 instruction when performing the pre-decoding operation, thus indicating that the sideband signals in bit position 14 and 15 cannot be relied upon, and may in fact be incorrect.

Considering the second half of the pre-decoded instruction, bits 17 to 34 are the same as bits 16 to 33 of the earlier described embodiment shown in FIG. 9. Bit position 35 is added so as to make the second pre-decoded instruction portion the same length as the first pre-decoded instruction portion, and in one embodiment bit 35 is set equal to 0. However, as will be discussed in more detail later, in an alternative embodiment bit position 35 may be used for another purpose.

In an alternative embodiment, rather than employing the incomplete field in bit position 17, the pre-decoding circuitry may be arranged in situations where it only has access to the first half-word of the Thumb 32 instruction when performing the pre-decoding operation, to set the instruction portion identifier in bit position 16 to identify that first pre-decoded instruction portion as relating to a Thumb 16 instruction, i.e. by setting bit position 16 to a logic 0 value. If such a pre-decoded instruction portion is later fetched from the instruction cache, the error detection circuitry 35 would observe that the instruction portion is actually part of a Thumb 32 instruction that has been incorrectly marked as a Thumb 16 instruction, and will accordingly signal an error, preventing the potentially corrupt pre-decoded instruction being executed by the processing circuitry. Accordingly, through this mechanism, the processing circuitry can be prevented from making use of an incompletely pre-decoded instruction without the need for a separate incomplete bit as shown in FIG. 12.

As another alternative embodiment to the embodiment shown in FIG. 12, the incomplete pre-decode identifier can be stored within the cache in association with the tag RAM entry for a particular cache line. When such an identifier is set (preferably this being provided as a single bit field), this will flag that the pre-decoded instruction portion appearing at the end of the cache line was subjected to an incomplete pre-decode operation, and hence cannot be relied upon to have been pre-decoded correctly.

In some embodiments, it may be more space efficient to provide this single identifier bit in association with each tag RAM entry, rather than seeking to accommodate that extra piece of information in each pre-decoded instruction.

Figure 13:
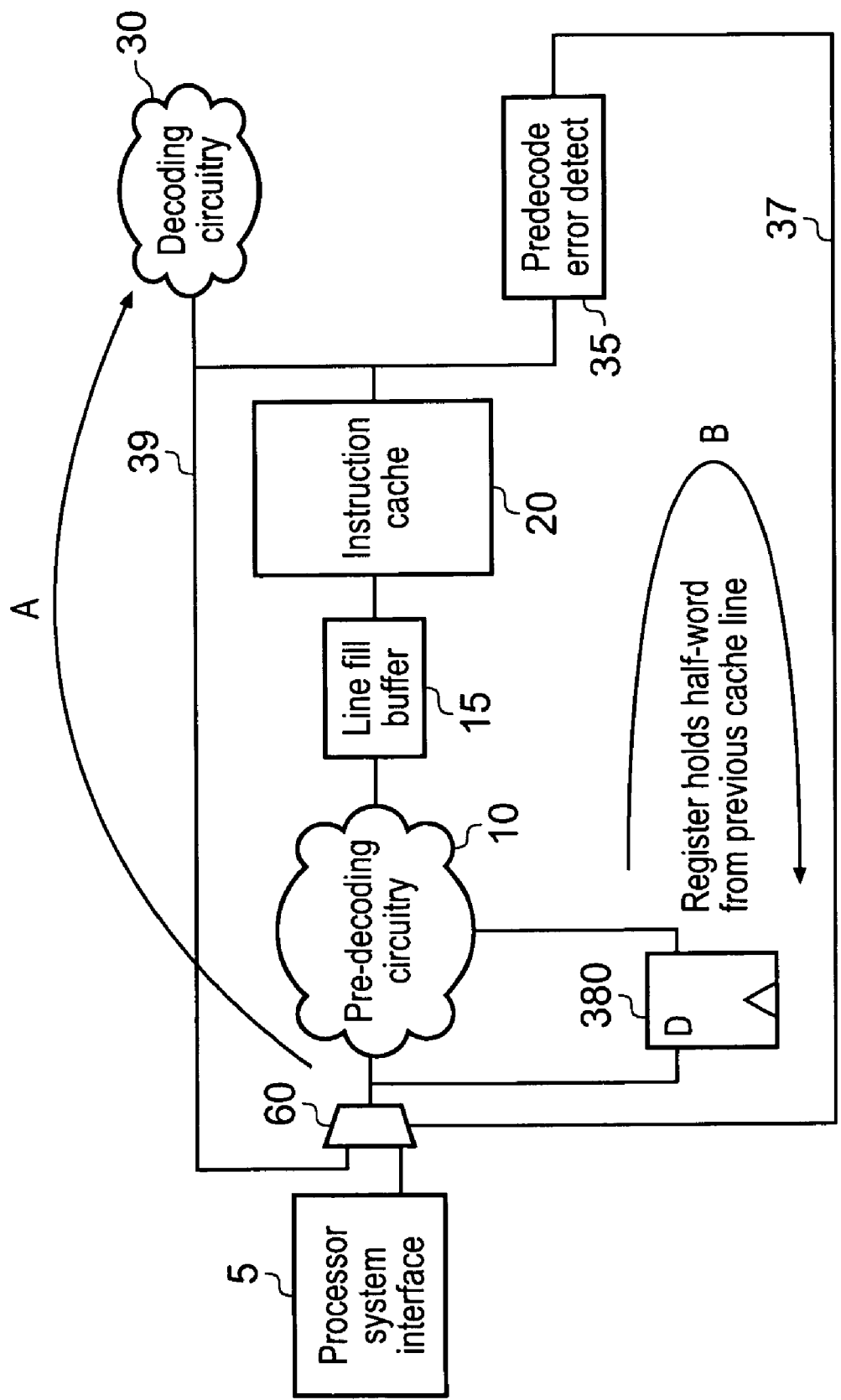
FIG. 13 illustrates two possible routes through the data processing apparatus for a Thumb 32 instruction that crosses a cache line boundary, in accordance with one embodiment.

FIG. 13 illustrates the two possible paths that a Thumb 32 instruction crossing a cache line boundary may take through the data processing apparatus. As shown in FIG. 13, a buffer 380 is provided for storing the last half word of a particular cache line fetched from the memory system via the processor system interface 5, this buffered information being used if that last half word was the first half word of a Thumb 32 instruction. If the processor is continuously fetching consecutive cache lines from memory, then by buffering this last instruction portion, the pre-decoding circuitry 10 can wait for the next cache line to be routed from memory to the pre-decoding circuitry 10 via the processor system interface 5 and the multiplexer 60, and at that point can perform the full pre-decode operation and generate the appropriate sideband signals using both half words of the instruction spanning the cache line boundary. As a result, when the pre-decoded instruction then passes through the linefill buffer 15 into the instruction cache 20, it can subsequently be read from the instruction cache and passed directly through the decoding circuitry 30, as indicated schematically by the path "A" in FIG. 13.

However, if the processor is not continuously fetching consecutive cache lines, the pre-decoded instruction portion corresponding to the first half of a Thumb 32 instruction crossing a cache line boundary will be subjected to an incomplete pre-decoding operation, and accordingly the incomplete pre-decode identifier will need to be set, using any of the above-mentioned three possible techniques. In such instances, when a Thumb 32 instruction including such a first pre-decoded instruction portion is read from the instruction cache 20, the pre-decode error detection circuitry 35 will detect the setting of the incomplete pre-decode identifier, and in one embodiment will cause the entire Thumb 32 instruction to be re-routed back via the multiplexer 60 into the pre-decoding circuitry 10, as indicated schematically by the path "B" in FIG. 13. In particular, a control signal is routed back to the multiplexer 60 from the pre-decode error detection circuitry 35 over path 37 to cause the multiplexer to select the instruction data presented over the loopback path 39. In embodiments of the present invention, this is possible due to the way the information created by the pre-decoding operation is added into the instruction when creating the pre-decoded instruction. In particular, the sideband signals are added into bit positions 15 and 14 because those bit positions becomes redundant once the instruction portion identifier is inserted in bit position 16. As a result, it is possible for the original instruction to be recreated readily from the pre-decoded instruction, and accordingly the instruction can be rerouted through the pre-decoding circuitry 10 without needing to re-fetch the instruction from memory.

In an alternative embodiment, if the original instruction cannot be recreated from the pre-decoded instruction, then the pre-decode error detection circuitry 35 can be arranged to cause the relevant two adjacent cache lines in the instruction cache to be invalidated, and a linefill operation to be performed to cause those two cache lines to be refetched sequentially from memory and passed through the pre-decoding circuitry.

It will be appreciated that following the detection of the error and repassing of the instruction through the pre-decoding circuitry, the instruction will then follow path A and can be retrieved into the decoding circuitry 30 when required by the processing circuitry.

Figure 14:
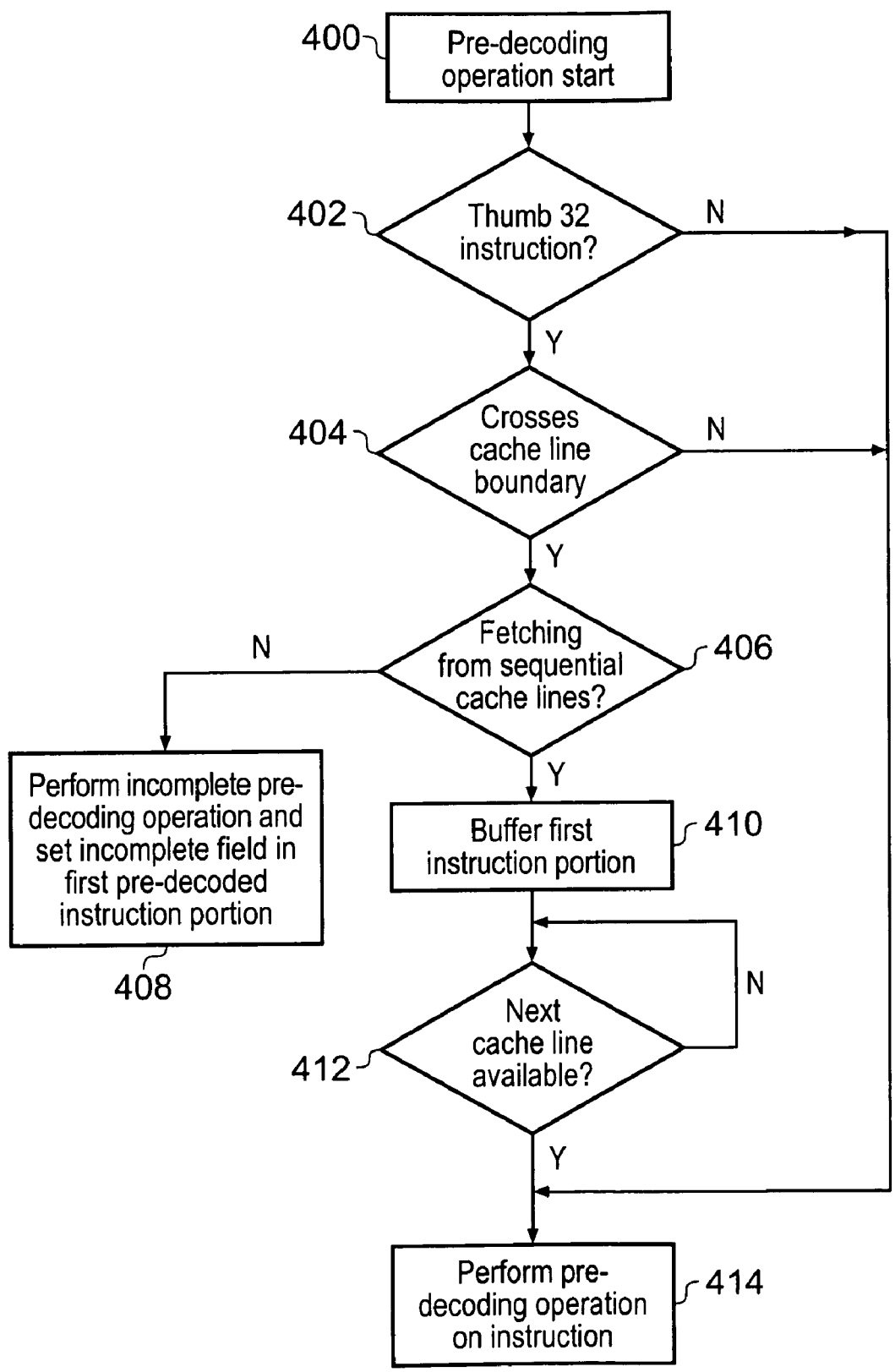
FIG. 14 is a flow diagram illustrating a pre-decoding operation sequence in accordance with one embodiment.

FIG. 14 schematically illustrates the operation of the pre-decoding circuitry in accordance with the above-described technique. The pre-decoding operation starts at step 400, and at step 402 it is determined whether the instruction is a Thumb 32 instruction. If it is, it is then detected at step 404 whether that Thumb 32 instruction crosses a cache line boundary, and if it does it is then determined at step 406 whether the processor is fetching from sequential cache lines.

If the processor is fetching from sequential cache lines, then the first instruction portion of the Thumb 32 instruction appearing at the end of the cache line is buffered in the register 380 at step 410, whereafter at step 412 the pre-decoding circuitry 10 awaits the receipt of the next cache line from the processor system interface 5. Once the next cache line is available, then the pre-decoding operation is performed on the Thumb 32 instruction at step 414 in the usual manner. The process will also proceed directly to step 414 if it is detected at step 402 that the instruction is not a Thumb 32 instruction, since in one embodiment of the present invention the instructions of any other instruction sets executed by the processor will be aligned with cache line boundaries. Similarly, if the instruction is a Thumb 32 instruction, but at step 404 it is determined that the Thumb 32 instruction does not cross the cache line boundary, then again the processor proceeds directly to step 414.

If at step 406 it is determined that the processor is not fetching from sequential cache lines, then the process proceeds to step 408 where an incomplete pre-decoding operation is performed in respect of the first half word of the Thumb 32 instruction, and the incomplete field is set to identify that the sideband signals added into the pre-decoded instruction portion have been produced using an incomplete pre-decoding operation.

From the above description, it will be seen that by providing such an incomplete pre-decode indication in association with one or more pre-decoded instruction portions, if a pre-decoded instruction including such a pre-decoded instruction portion is later read from the cache by the processing circuitry, that indication will flag to the processing circuitry that the pre-decoded instruction is potentially corrupted, allowing the processing circuitry to take appropriate action. Hence, incorrect operation resulting from execution of instructions that have been incompletely pre-decoded can be avoided without significant additional cost and complexity in the design.

In the embodiments discussed above, an abnormal instruction identifier is added only to T32 instructions. For example, this can be done by adding sideband information to the first portion T32a of a T32 instruction. An abnormal instruction identifier is not added to a T16 instruction. To some extent, this is acceptable as the T16 instruction set is small enough that abnormal instructions can be decoded more easily than for T32 instructions, and so less power is consumed by the decoding circuitry in decoding these abnormal instructions.

However, in one embodiment, the first portion T32a of a T32 instruction is extended when an incomplete pre-decode identifier is added. In order to make best use of the memory space available, two T16 instructions should be the same length as one T32 instruction (or an ARM instruction). Thus, as the first portion of the T32 instruction has been extended to accommodate the incomplete pre-decode identifier, an additional bit can also be added to the T16 instruction during pre-decoding. This bit can be used to store an abnormal instruction identifier. For example, the bit could contain sideband information which indicates whether or not the instruction is an undefined instruction. In this way, the power consumed in decoding undefined instructions can be reduced.

The second portion T32b of a T32 instruction does not need an abnormal instruction identifier because this information will be contained in the first portion T32a. However, it is important that the pre-decoding operation performed on the T32b portion is the same as the operation performed on a T16 instruction by the pre-decoding circuitry 10. Thus, if a block is speculatively identified as representing a T32b portion, then the pre-decoding circuitry 10 adds an abnormal instruction identifier which indicates, provisionally assuming (against the speculation) that the block represents a T16 instruction, whether or not that T16 instruction is abnormal. Thus, the operation performed on a block is the same regardless of whether it is identified as a T16 instruction or a T32b portion. If the pre-decoding circuitry 10 mistakenly identifies a T16 instruction as a T32b portion, then this does not matter because the abnormal instruction identifier is added to the block anyway, and so a pre-decoding error does not occur. If the speculation was correct, then the abnormal instruction identifier in the T32b portion can be ignored.

FIG. 15 shows the format of a T16 instruction and a T32 instruction once pre-decoding operations have been performed on them according to at least some embodiments. For a block speculatively identified as a T16 instruction, an instruction portion identifier is added in bit [16] and set to "0", and a sideband bit is added in bit [17] indicating whether the instruction is abnormal. The T16 opcode in bits [15:0] is unmodified. The same operation is performed on a block speculatively identified as representing the second portion T32b of a T32 instruction. An instruction portion identifier is added in bit [34] and set to "0", and a sideband bit is added in bit [35] indicating, while provisionally identifying the block as a T16 instruction, whether the T16 instruction is abnormal. The second half of the T32 opcode in bits [33:18] is unmodified.

For a block speculatively identified as the first portion T32a of a T32 instruction, the pre-decoding circuitry 10 adds sideband information to bits [15:14] of the block. An instruction portion identifier is added in bit [16] and set to "1", and an incomplete pre-decode identifier is added in bit [17] indicating whether the T32 instruction spans a cache line boundary.

Thus, the same pre-decoding operation is performed on a block regardless of whether it is identified as a T16 instruction or as a T32b portion. The error-resistant pre-decode format used for instructions also consistently utilizes extra bits which are available to convey an abnormal instruction identifier.

The process of step 202 in FIG. 11, in which blocks are pre-decoded by the pre-decoding circuitry 10, is described in more detail with reference to FIG. 16. In step 250, the pre-decoding circuitry 10 speculatively identifies which instruction portion a block represents. In step 254, the pre-decoding circuitry 10 detects whether or not the block has been identified as the first portion T32a of a T32 instruction.

If the pre-decoding circuitry 10 identifies the block as the first portion T32a of a T32 instruction, then flow proceeds to step 260, in which the pre-decoding circuitry 10 detects whether the T32 instruction is an abnormal instruction. In step 262, the pre-decoding circuitry 10 adds sideband information to the block depending on whether or not the T32 instruction is an abnormal instruction. In step 264, the pre-decoding circuitry 10 adds an instruction portion identifier in the form of an ID bit which is added at bit [16] of the block and set to "1".

On the other hand, if at step 254 the pre-decoding circuitry 10 did not identify the block as a T32a portion, then flow proceeds to step 270. The pre-decoding circuitry 10 provisionally assumes that the block represents a T16 instruction, and detects whether or not that T16 instruction is an abnormal instruction. Then, in step 272, independent of whether the block is a T16 instruction or the second portion T32b of a T32 instruction, the pre-decoding circuitry 10 adds sideband information to the block indicating whether or not the T32 is an abnormal instruction. At step 274, the pre-decoding circuitry 10 then adds an instruction portion identifier in the form of an ID bit which is added at bit [16] of the block and set to 0.

Figure 16:
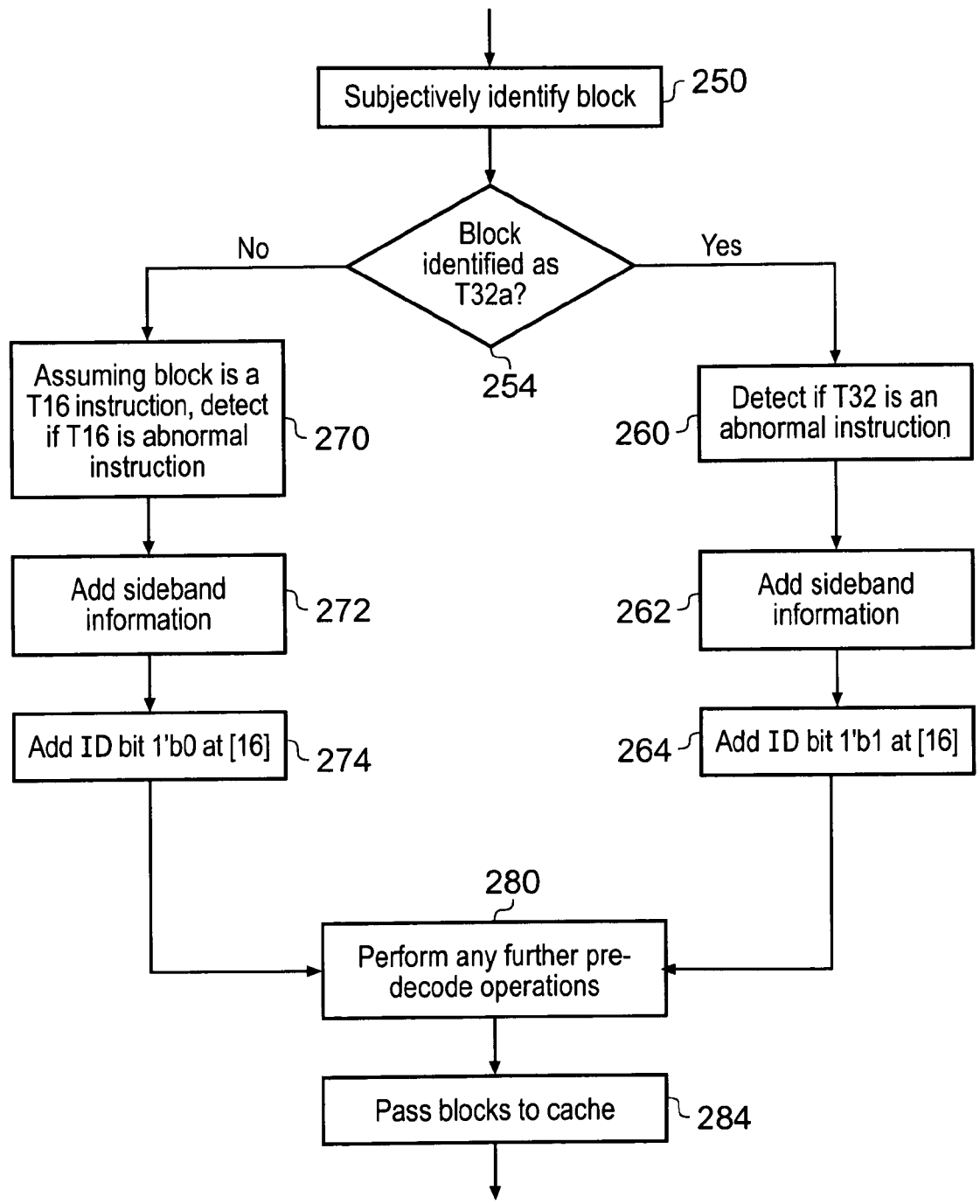
FIG. 16 is a flow diagram illustrating in more detail the steps performed to implement step 202 of FIG. 11 in accordance with one embodiment.

For both paths through the flow diagram in FIG. 16, flow then proceeds to step 280, in which any further pre-decoding operations are performed by the pre-decoding circuitry 10. This may include, for example, adding the operation discussed in relation to FIG. 14 for adding an incomplete instruction identifier. Once any further pre-decoding operations are complete, the pre-decoded blocks are then passed to the cache 20 in step 284. Flow then returns to step 204 in FIG. 11.

Another problem that can occur within the data processing apparatus when using the pre-decoding circuitry is when there is a mix of instruction states within a particular cache line. As a particular example, an ARM processor may be able to execute instructions from either the ARM, Thumb, ThumbEE or Jazelle instruction sets developed by ARM Limited, United Kingdom, and it is possible for one cache line to include instructions from more than one of the instruction sets.

At any particular point in time, the processing circuitry will be in a particular processor state, dependent on which instruction set the instructions currently being executed belong to. Hence, at one point in time, the processing circuitry may be in the ARM processor state, whilst at a subsequent point it may branch into a sequence of Thumb instructions, and hence enter the Thumb processor state.

When pre-decoding instructions, the pre-decoding circuitry needs to assume a speculative processor state when performing the pre-decoding, and this chosen speculative processor state would then typically be used for pre-decoding a whole cache line's worth of instructions received via the processor system interface 5. In one particular embodiment, the speculative processor state is chosen to be the state of the processor at the time the pre-decoding operation is performed by the pre-decoding circuitry. It will be appreciated that the instruction cache 20 could store pre-decoded instructions which have become corrupted if, for example, the chosen speculative processor state is not an appropriate processor state for all of the instructions in the cache line. For example, if the processor is in Thumb state when the pre-decoding operation is performed for a particular cache line, but the cache line mixes up ARM and Thumb instructions, then it will be appreciated that the ARM instructions may be pre-decoded incorrectly, resulting in corrupted pre-decoded instructions for those ARM instructions. Indeed, it is also possible for an entire cache line to be pre-decoded in the wrong state if the last instruction in one cache line is a state changing branch instruction, and the next cache line is already being subjected to the pre-decoding operation by the pre-decoding circuitry.

Figure 18:
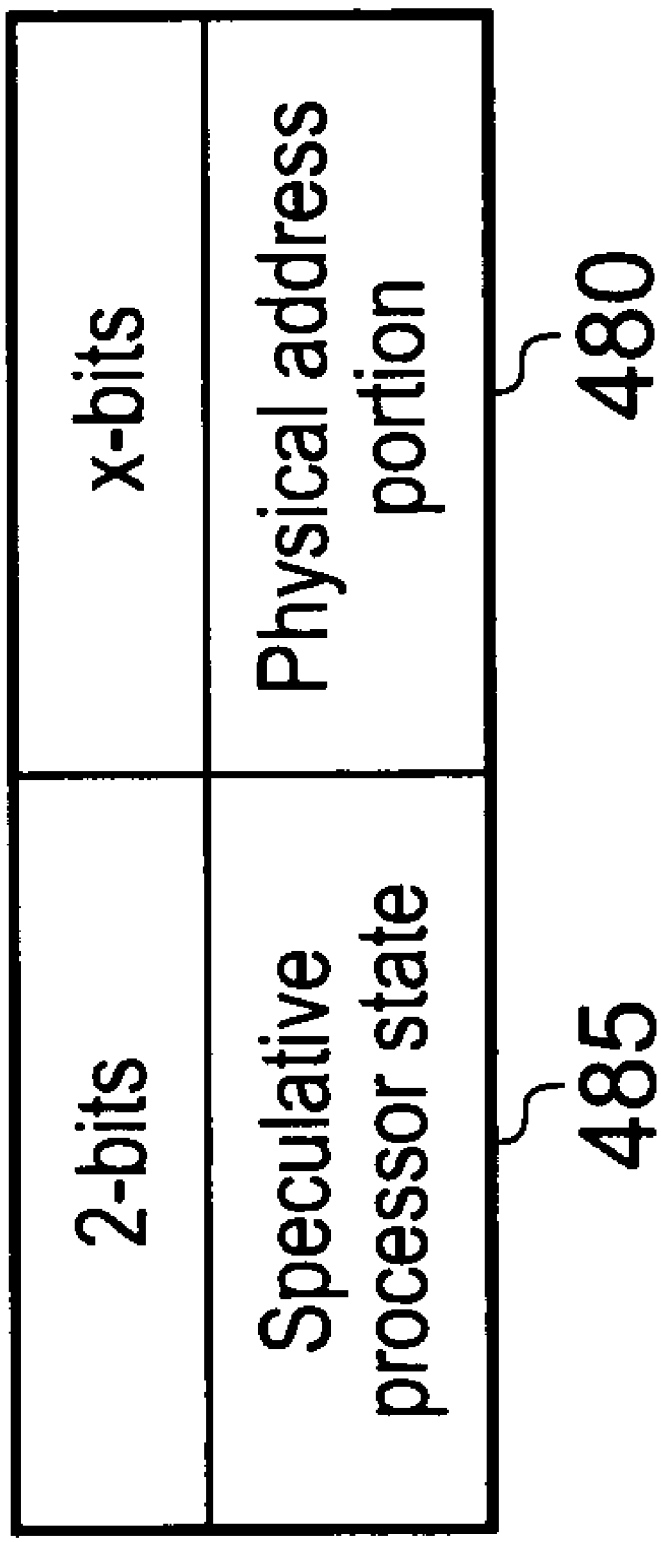
FIG. 18 illustrates how each entry of the tag RAM of the cache is extended to store speculative processor state in accordance with one embodiment.

Whilst it would be possible to mark every half word that is pre-decoded with an indication of the speculative processor state used for the pre-decoding, this would consume a significant amount of area in the instruction data RAMs of the instruction cache. Since it is rare that cache lines mix state, in one embodiment the cache line is marked with the state the processor was in when the cache line was pre-decoded, this proving to be more area efficient. Accordingly, in one embodiment each entry in the instruction tag RAMs of the cache can be extended to store the speculative processor state as shown schematically in FIG. 18. As will be understood by those skilled in the art, each entry in an instruction tag RAM will typically store an address portion 480, and will also often store one or more other control bits, for example a valid bit to indicate whether the associated cache line is valid. As shown in FIG. 18, an additional two bits can be provided for each entry to identify the speculative processor state 485 that was used when performing the pre-decoding operation on the corresponding cache line in the instruction data RAM.

Figure 17:
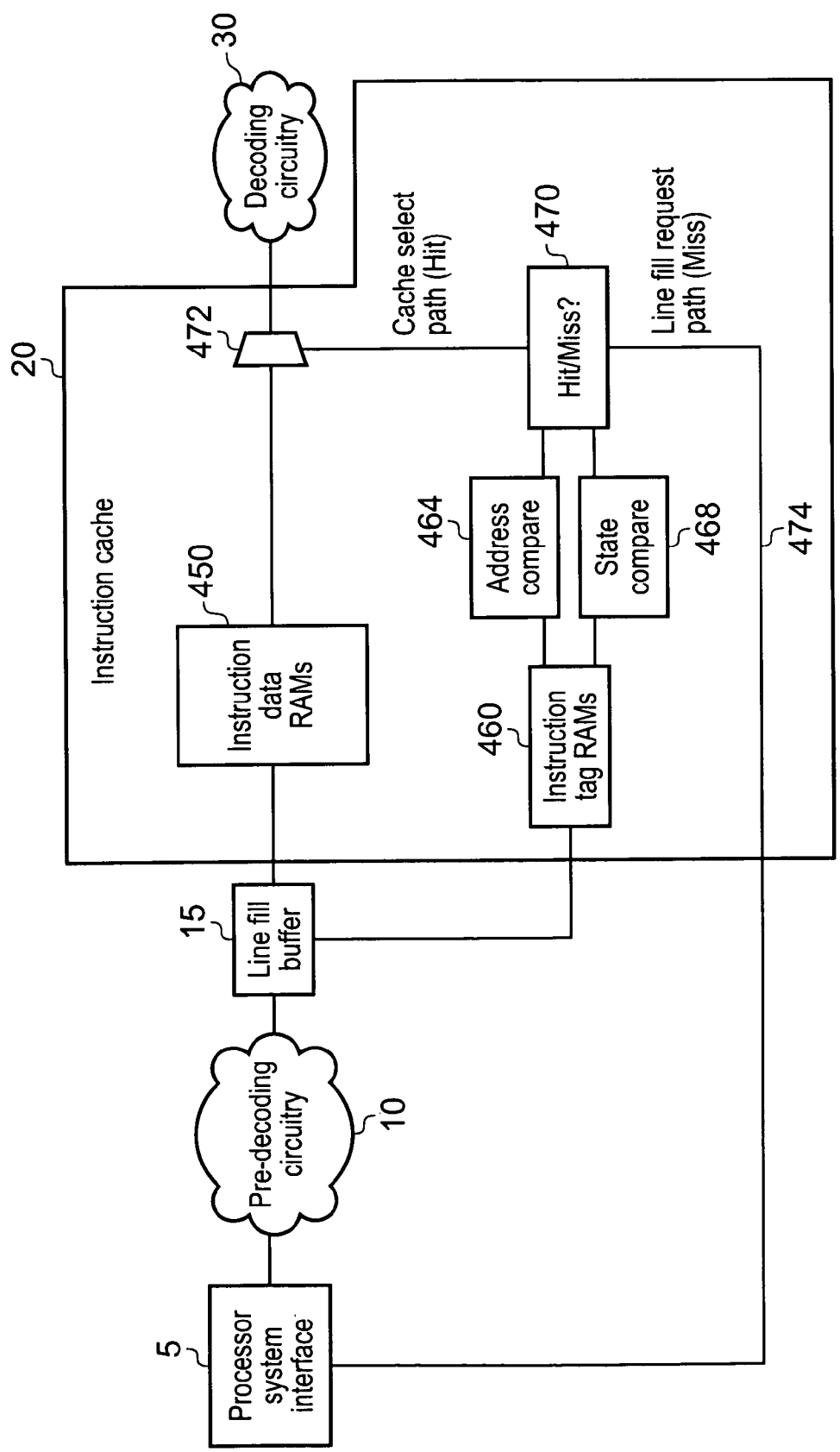
FIG. 17 illustrates components provided within the instruction cache in accordance with one embodiment.

FIG. 17 illustrates in more detail components provided within the instruction cache 20 when such an extended tag RAM entry is used within the instruction tag RAMs. As shown in FIG. 17, as the pre-decoded instructions for a particular cache line are stored in that cache line within an instruction data RAM 450 of the instruction cache, the corresponding entry in the relevant instruction tag RAM 460 is populated with the address portion 480 and the speculative processor state information 485, which will have been output by the pre-decoding circuitry 10.

When the processor subsequently issues an access request seeking to read an instruction from the instruction cache 20, the cache performs a lookup operation using the address comparison circuitry 464, the state comparison circuitry 468 and the hit/miss circuitry 470. In particular, the address comparison circuitry 464 determines whether the address specified by the access request matches any of the address portions stored in selected entries within the instruction tag RAMs 460. In one embodiment, the instruction cache 20 is arranged as an n-way set associative cache, and in one particular embodiment takes the form of the two-way set associative cache shown in FIG. 19. Accordingly, in such an embodiment there will be two tag RAMs 460-0 and 460-1, and an associated two data RAMs 450-0 and 450-1. For each cache line 492, there will be a corresponding entry 490 in the associated tag RAM for storing the information shown schematically in FIG. 18.

Figure 19:
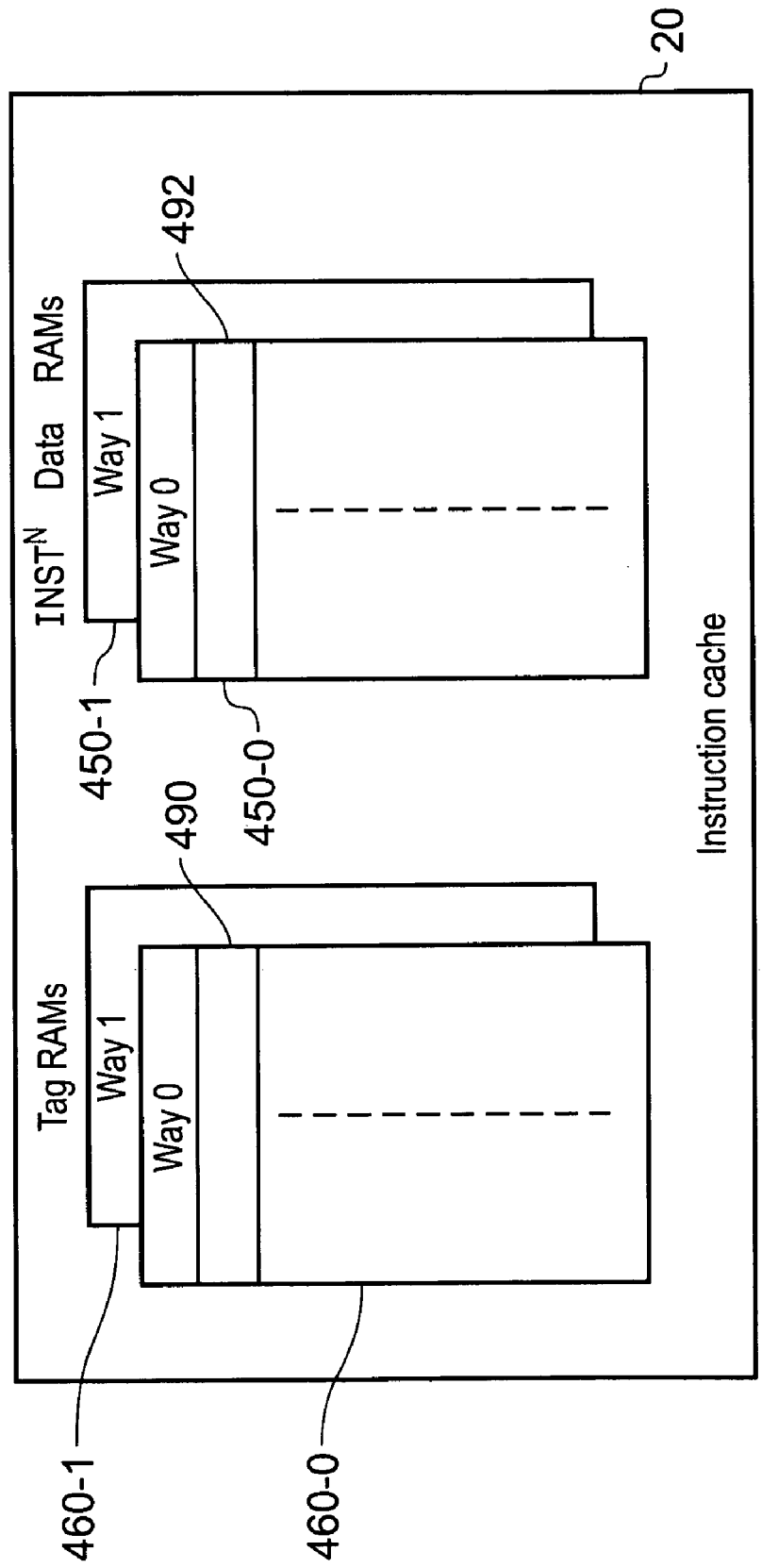
FIG. 19 schematically illustrates the construction of a two-way set associative instruction cache as used in one embodiment.

It will be appreciated by those skilled in the art that when an access request is issued by the processing circuitry, an index portion of the address is used to identify a particular set in the instruction cache, each set comprising one cache line in each way, and accordingly for the example of FIG. 19 each set comprising two cache lines. A tag portion of the address specified in the access request is then compared with the address portion 480 stored in the corresponding entry in each tag RAM, and accordingly for the example of FIG. 19 the address comparison logic 464 will perform two address comparisons, namely comparing the tag portion of the address with the address portion 480 from the entry in each tag RAM that is associated with the set specified by the index portion of the address.

Furthermore, in addition to performing the address comparison using the address comparison circuitry 464, state comparison circuitry 468 also performs a comparison of the current processor state against the speculative processor state 485 stored in those accessed entries in the tag RAM. The hit/miss circuitry 470 is arranged to only detect a hit condition if both the address comparison circuitry 464 identifies a match, and the state comparison circuitry 468 also identifies a match, i.e. a hit condition is only detected if the instruction seeking to be accessed is present in the instruction cache and the speculative processor state used to pre-decode that instruction matches the current processor state.

In the event of a hit condition, the multiplexer 472 is caused to output the instruction read from the data RAM 450 of the appropriate way in the instruction cache, from where that instruction is then provided to the decoding circuitry 30.

If a hit condition is not detected, then a miss signal is issued over path 474, causing a linefill request to be issued from the processor system interface 5. As a result, the relevant cache line of instructions will be fetched from memory and passed through the pre-decoding circuitry 10.

It will be appreciated that there are two types of miss condition. The first is the classical one where the instruction seeking to be accessed is not currently in the instruction cache, and in this instance the output from the pre-decoding circuitry 10 can be allocated to the instruction cache in the usual manner. For the two way set associative cache example discussed earlier, this will involve cleaning and invalidating the cache line contents in one of the ways, and allocating the newly pre-decoded instructions to that cache line. However, another miss condition that can now be generated is where the address comparison circuitry 464 detects a match, i.e. the instruction is present in the cache, but the state comparison circuitry 468 does not detect a match, and hence identifies that the relevant instruction has been pre-decoded assuming a wrong processor state. In this instance, the cache miss causes a re-fetch of the cache line from memory, along with a re-pass of the fetched instructions through the pre-decoding circuitry. While in one embodiment the output from the pre-decoding circuitry 10 in such a situation could be allocated in exactly the same manner as discussed above, in an alternative embodiment the output from the pre-decoding circuitry 10 will preferentially be allocated to a different way. This can avoid a potential "thrashing" problem that could otherwise arise in situations where the cache line contains instructions from more than one instruction set.

To illustrate this thrashing problem, consider the example where a first part of the cache line contains Thumb instructions and the second part of the cache line contains ARM instructions, with the whole cache line initially being pre-decoded assuming a Thumb processor state. It will be appreciated that if one of the ARM instructions is then accessed while the processing circuitry is in the ARM processor state, it will be detected by the state comparison circuitry 468 that the speculative processor state (i.e. the Thumb state) does not match the current processor state (i.e. the ARM state), and accordingly the re-fetch process described above will be performed. This time, the entire cache line will be pre-decoded assuming the ARM processor state, which now provides the correct pre-decoded ARM instruction that was the subject of the access request. However, if this output from the pre-decoding circuitry was used to overwrite the previous cache line contents, then if at a later stage the processing circuitry whilst in the Thumb processor state seeks to access one of the Thumb instructions in the first part of the cache line, it will be seen that a miss condition will again be detected since the state comparison circuitry 468 will again identify that the speculative processor state and the current processor state do not match.

By allocating the output from the pre-decoding circuitry 10 to a different cache line in such situations, this problem can be avoided, since it allows both versions to co-exist in the cache. Accordingly, considering the earlier example, the same set of instructions forming a particular cache line's worth of pre-decoded instructions will be stored in one cache line as a series of pre-decoded instructions that were pre-decoded assuming the Thumb processor state, and will be stored in another cache line in a different way as a series of pre-decoded instructions that were pre-decoded assuming the ARM processor state.

Whilst this avoids the above thrashing problem, when cleaning and invalidating the cache, the clean and invalidate operation will need to operate over multiple cache lines per physical address if the instruction at the physical address has been stored in multiple cache lines due to the above-described procedure.

Figure 20:
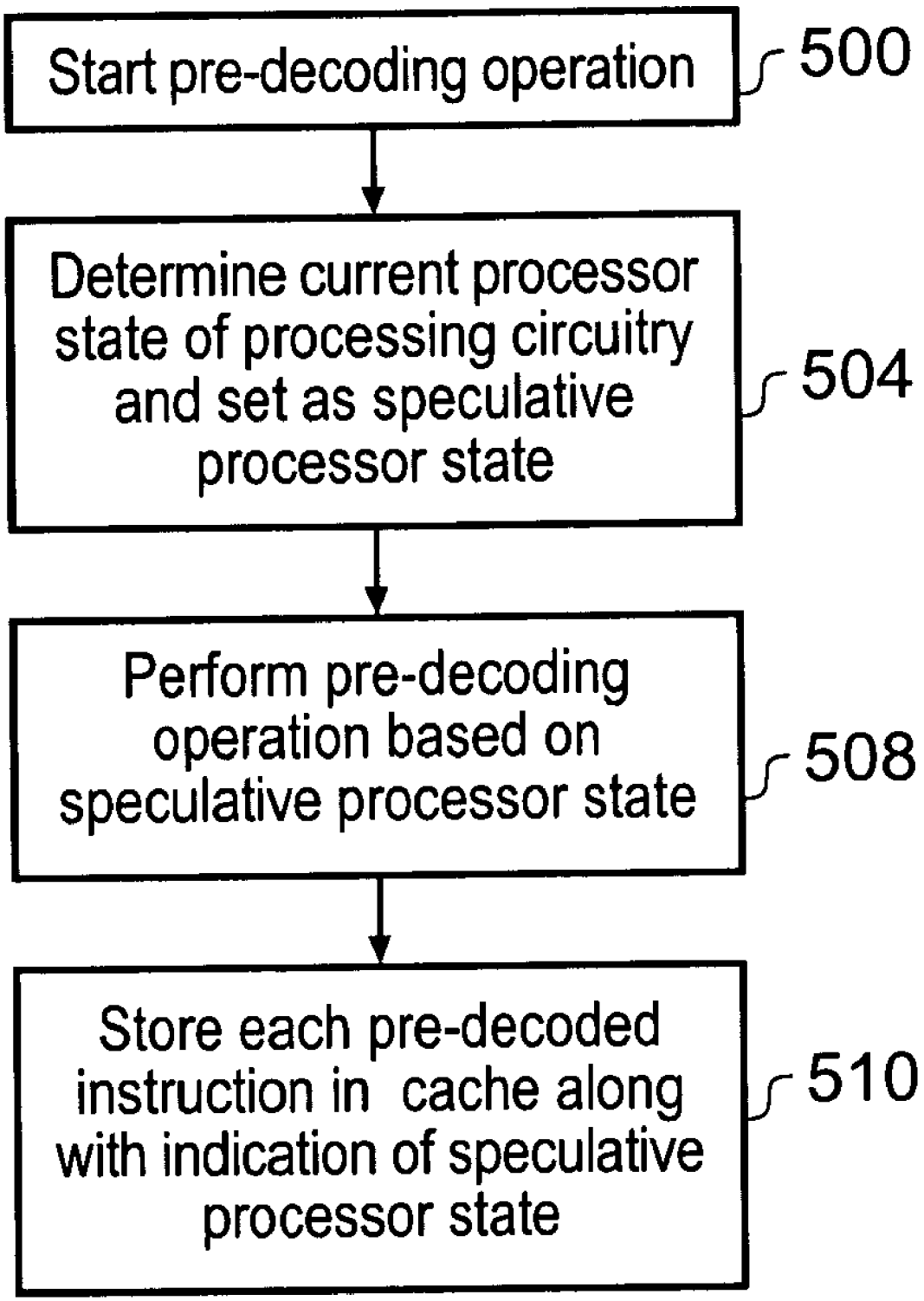
FIG. 20 is a flow diagram illustrating the pre-decoding operation according to one embodiment.

FIG. 20 illustrates the above-described pre-decoding operation of one embodiment. At step 500, the pre-decoding operation starts, whereafter at step 504 the current processor state of the processing circuitry is determined and set as a speculative processor state. Thereafter, at step 508, the pre-decoding operation is performed by the pre-decoding circuitry 10 using the speculative processor state. Then each pre-decoded instruction is stored in the cache 20 at step 510 along with an indication of the speculative processor state.

Figure 21:
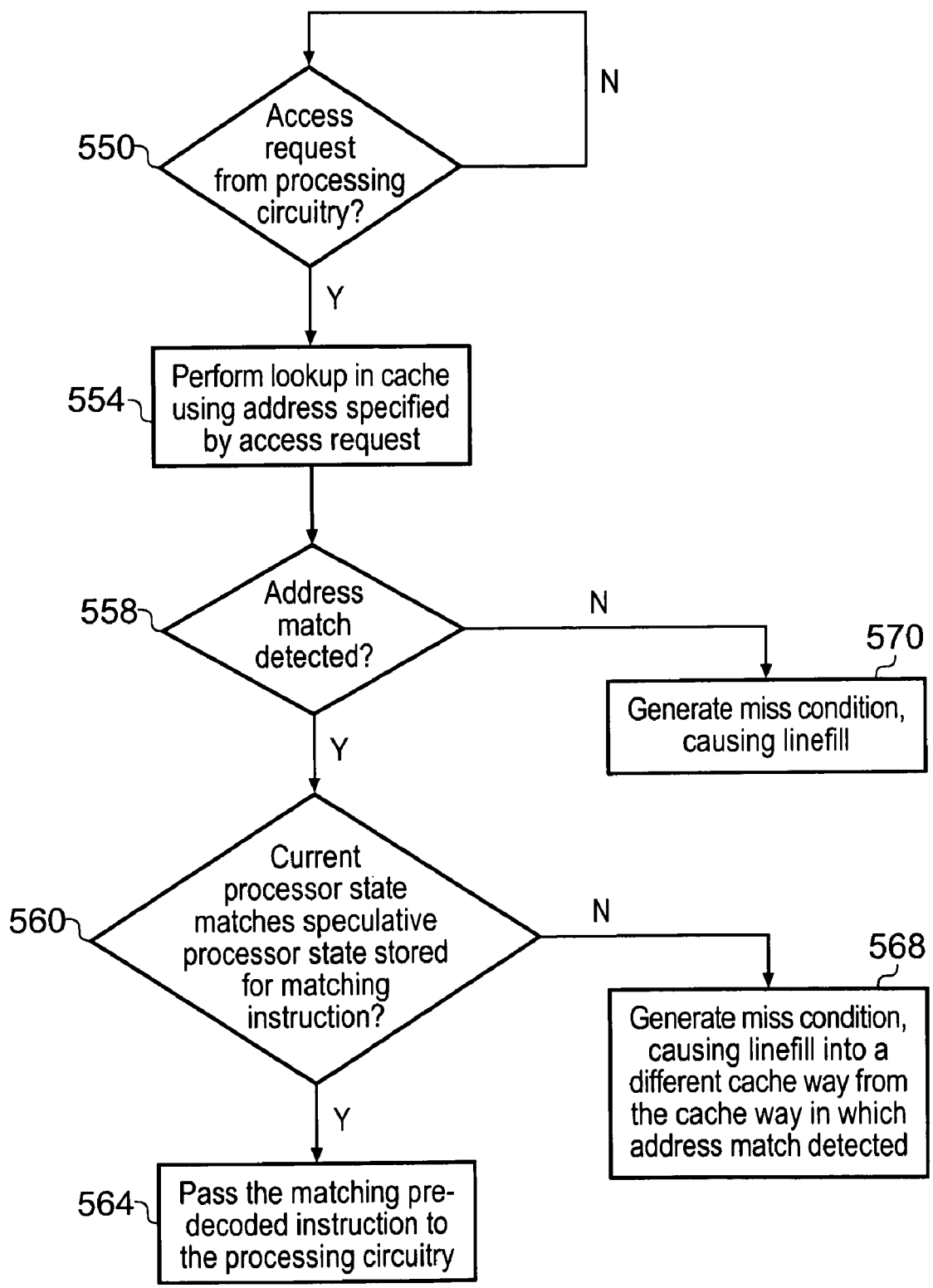
FIG. 21 illustrates a cache lookup procedure in accordance with one embodiment.

FIG. 21 illustrates schematically the process performed by the instruction cache 20 upon receipt of an access request from the processing circuitry. At step 550, an access request from the processing circuitry is awaited, and on receipt of such an access request a lookup procedure is performed in the cache at step 554 using the address specified by the access request.

At step 558, it is determined whether the address comparison circuitry 464 has detected an address match, and if not the hit/miss circuitry 470 generates a miss condition at step 570, causing a linefill operation to take place.

If at step 558, an address match is detected, then at step 560 it is determined whether the state comparison circuitry 468 has detected a match between the current processor state and the speculative processor state stored in the relevant instruction tag RAM entry. If so, the hit/miss circuitry 470 generates a hit signal causing the matching pre-decoded instruction to be output from the relevant data instruction RAM 450 via the multiplexer 472 to the decoding circuitry 30 of the processing circuitry 25. However, if at step 560 it is determined that the current processor state does not match the speculative processor state, then a miss condition is generated at step 568 causing a linefill operation to take place into a different cache way from the cache way in which the address match was detected by the address comparison circuitry 464.

Often a state changing instruction used to trigger a change in processor state will cause a branch to a new address (and hence a different cache line) containing the first instruction to be executed in the new processor state. However, in an alternative embodiment, this may not be the case, and hence following a state changing instruction the next instruction to execute may be the next instruction in the same cache line. In such situations, a problem can arise when a fetch from the instruction cache contains more than one instruction, and one instruction in that fetch (other than the last one) is a state changing instruction. In this case a 'hit' will correctly occur for the fetch, but all instructions after the state changing instruction will have been incorrectly pre-decoded in the case where the instruction cache holds a cache line that has been pre-decoded in only one state. To address this, in one embodiment the error detection circuitry 35 is arranged to spot this situation, to trigger a 'state error' for the sequential instructions after the state changing instruction, and to initiate either a line fill or a loop back through the pre-decode process.

In a transition between the ARM and Thumb instruction sets this potential problem will not occur since the state changing instruction is a BLX type instruction that branches to a new cache line. However in a transition between the Thumb and ThumbEE instruction sets, this problem could arise since the state changing instruction (ENTERX/LEAVEX) does not use a branch and hence a fetch from a new address will not be triggered by the state changing instruction. In this case the error detection mechanism described above can be used to identify the state changing instruction, trigger a 'state error' for the sequential instructions after the state changing instruction, and then initiate a new fetch from the memory address immediately after the state changing instruction.

Figure 22:
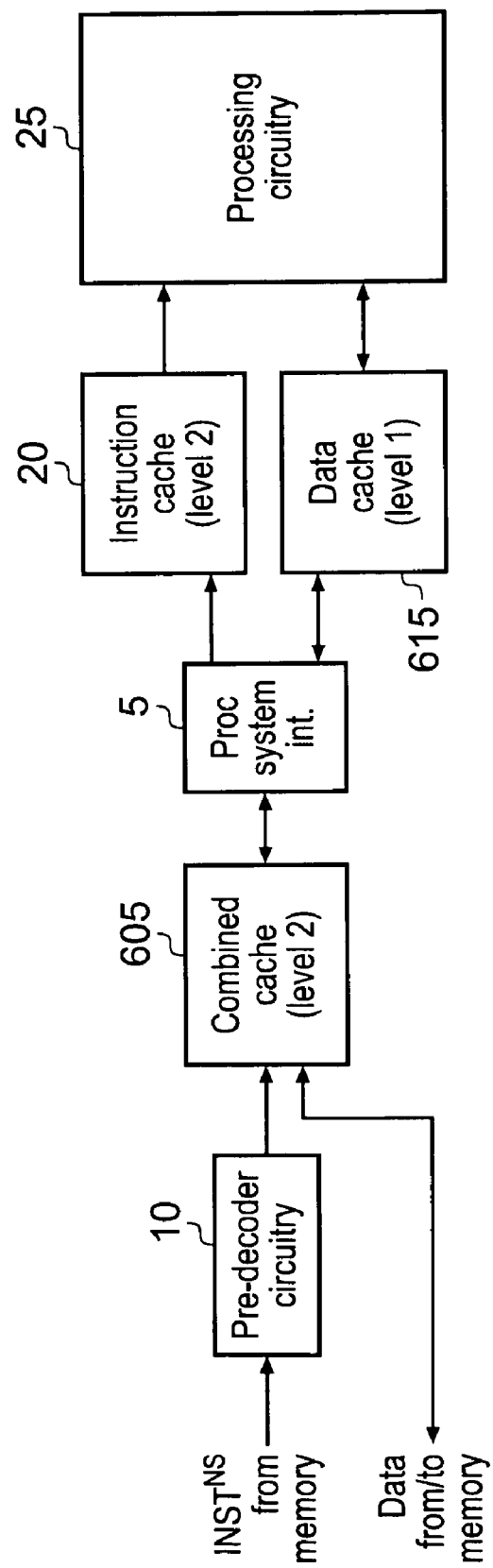
FIG. 22 illustrates one embodiment where the pre-decoder circuitry is associated with a combined level two cache within the data processing apparatus.

Whilst in the above described embodiments the pre-decoder circuitry has been associated with a level one instruction cache used to directly provide instructions to the processing circuitry 25, in an alternative embodiment as shown in FIG. 22 the pre-decoder circuitry 10 may be associated with a combined cache storing both instructions and data, for example a level two cache 605. As shown in this figure, the processor system interface 5 actually communicates with the combined level two cache 605, rather than directly with memory, and for completeness the level one data cache 615 is also shown in addition to the instruction cache 20 discussed earlier. In this embodiment, instructions from memory would be routed through the pre-decoder circuitry 10 to create pre-decoded instructions for storing in the combined level two cache 605. However, data retrieved from memory to the level two cache, or written back to memory from the level two cache, will bypass the pre-decoder circuitry 10.

Figure 23:
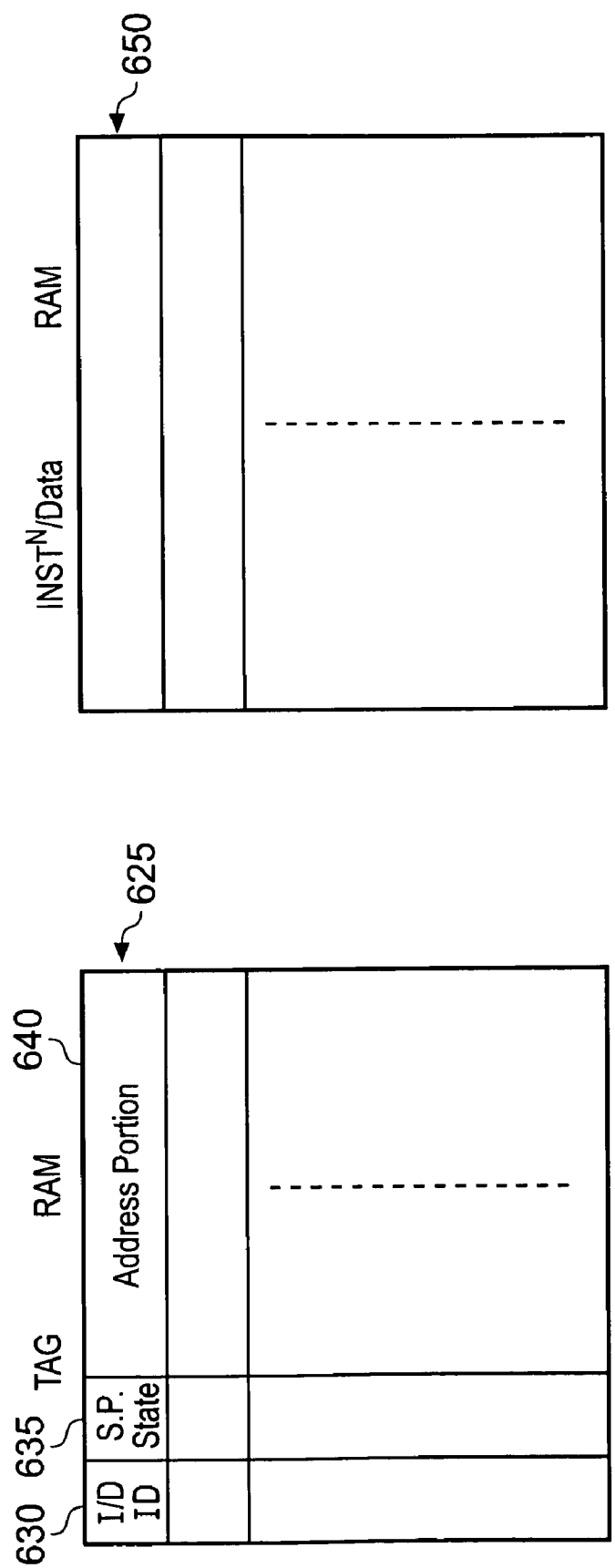
FIG. 23 illustrates the use of an additional instruction/data identifier value in association with each cache line in the combined level two cache of FIG. 22.

As shown in FIG. 23, an additional identifier 630 can be associated with each cache line to identify whether the cache line stores instructions or data. This will be added in addition to the speculative processor state bits 635 and address portion 640 within each tag RAM entry 625, hence identifying for the corresponding cache line 650 whether the contents of that cache line are pre-decoded instructions, or instead are data values used by the processing circuitry when executing those instructions. By such an approach, the instruction/data identifier 630 enables those cache lines which have been subjected to pre-decoding to be clearly identified. Accordingly, when performing lookup procedures in the cache, it can be determined whether there is any need to check speculative processor state against current processor state during the lookup procedure, in particular such a check only being necessary for those cache lines storing pre-decoded instructions.

As mentioned earlier, in addition to storing the speculative processor state within entries of the tag RAMs of the cache, those tag RAM entries may also provide other control information, for example a valid bit per entry indicating whether the corresponding cache line contents are valid or invalid. In the above described embodiment where a two bit field is provided for speculative processor state, then if a one bit field is used to represent valid/invalid information, this requires three bits per entry in the tag RAMs to store both pieces of information.

In one embodiment area and power savings are achieved by merging these two items of information into a single field of reduced size, thereby reducing the size requirements of the tag RAMS, and reducing the power consumed when accessing those tag RAMs. In particular FIG. 32 shows one possible merged field where a single two bit field is used to replace the need for three bits of information. In particular, as mentioned earlier, an ARM processor may be able to execute instructions from either the ARM, Thumb, ThumbEE or Jazelle instruction sets developed by ARM Limited, United Kingdom, and accordingly at any point in time will be in one of four possible processor states. However, the ThumbEE state can be pre-decoded as if the processor is in Thumb state, as the difference between ThumbEE and Thumb instructions are not significant enough to merit a separate pre-decoder. As a result this can free up one of the possible 2-bit values in a 2-bit speculative processor state indication. Hence, as shown in FIG. 32, the values 00, 01 and 10 can be used to represent speculative processor states of ARM, Thumb and Jazelle, respectively, with the value of 11 then being free to be used as an invalid identifier to indicate that the associated cache line's contents are invalid.

The speculative processor state associated with a pre-decoded instruction is not used if that pre-decoded instruction is marked as invalid in the cache, and in the above embodiment this fact is taken advantage of in order to provide a more efficient encoding of the speculative processor state and valid/invalid information. In particular, if speculative processor state values are being stored within the cache, there is no need to separately identify a cache line as valid, and all that is needed is to provide a mechanism of marking cache lines as invalid. Hence, in the above embodiment, a pre-decoded instruction located in the cache can be assumed to be valid if the associated 2-bit field identifies one of the speculative processor states, and is to be considered invalid if the 2-bit field instead encodes the invalid identifier.

It will be appreciated that the above technique for merging speculative processor state indications and invalid identifiers into a single field is not restricted to the 2-bit field example of FIG. 32, or to the particular examples of speculative processor states given. Instead the technique can be applied in any situation where the indication of speculative processor state is stored in a multi-bit field having n possible values, with the number of different speculative processor states being less than n. In such cases an invalid identifier used to identify if one or more associated pre-decoded instructions are invalid can be encoded within the multi-bit field using one of the n possible values not used to represent a speculative processor state.

Since valid/invalid information is typically stored on a cache line by cache line basis, this approach is particularly beneficial where the speculative processor state is stored on a per cache line basis. In particular, in one embodiment, the indication of speculative processor state is stored in a multi-bit field within each entry of the tag portion of a cache, the multi-bit field having n possible values, the number of different speculative processor states being less than n, and the invalid identifier is encoded within the multi-bit field using one of the n possible values not used to represent a speculative processor state.

Figure 33A:
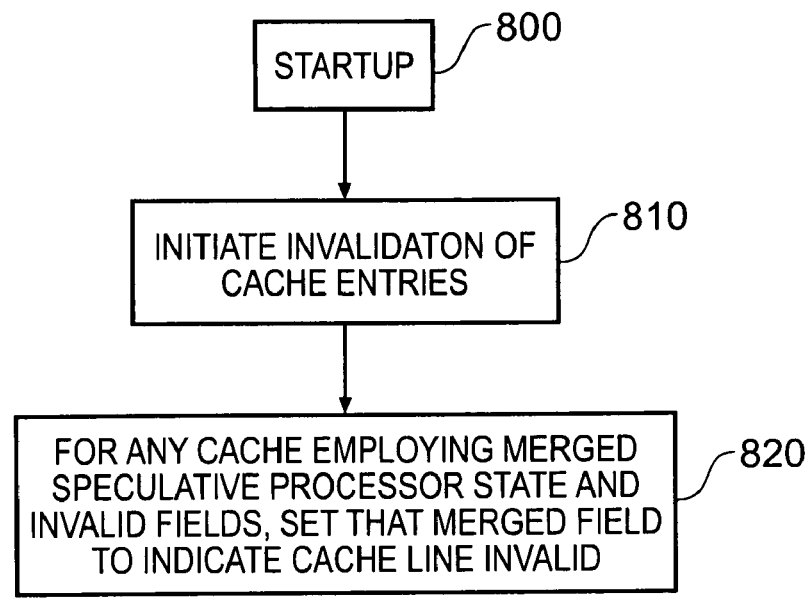
FIGS. 33A and 33B are flow diagrams illustrating situations where the speculative processor state field of FIG. 32 will be set to identify one or more pre-decoded instructions stored in the cache as invalid.

The value in the multi-bit field may be set to represent the invalid identifier at any appropriate point where the corresponding cache line is invalidated. For example, as shown in FIG. 33A, on initiation of a startup procedure of the data processing apparatus at step 800, invalidation of the cache entries in the caches of the data processing apparatus is initiated at step 810, since it is typically the case that cache contents are invalidated at startup to avoid any false hits in the caches. As indicated at step 820, for any caches employing merged fields for speculative processor state and invalid identifiers, the value stored in those merged fields will at this point be set to represent the invalid identifier (e.g. set to the value 11 considering the example of FIG. 32), thereby indicating that the contents of the corresponding cache lines are invalid. By this approach, the contents of individual cache lines, whole cache ways, or even of the entire cache, may be invalidated without the need to provide a separate valid field per cache line within the cache.

Figure 33B:
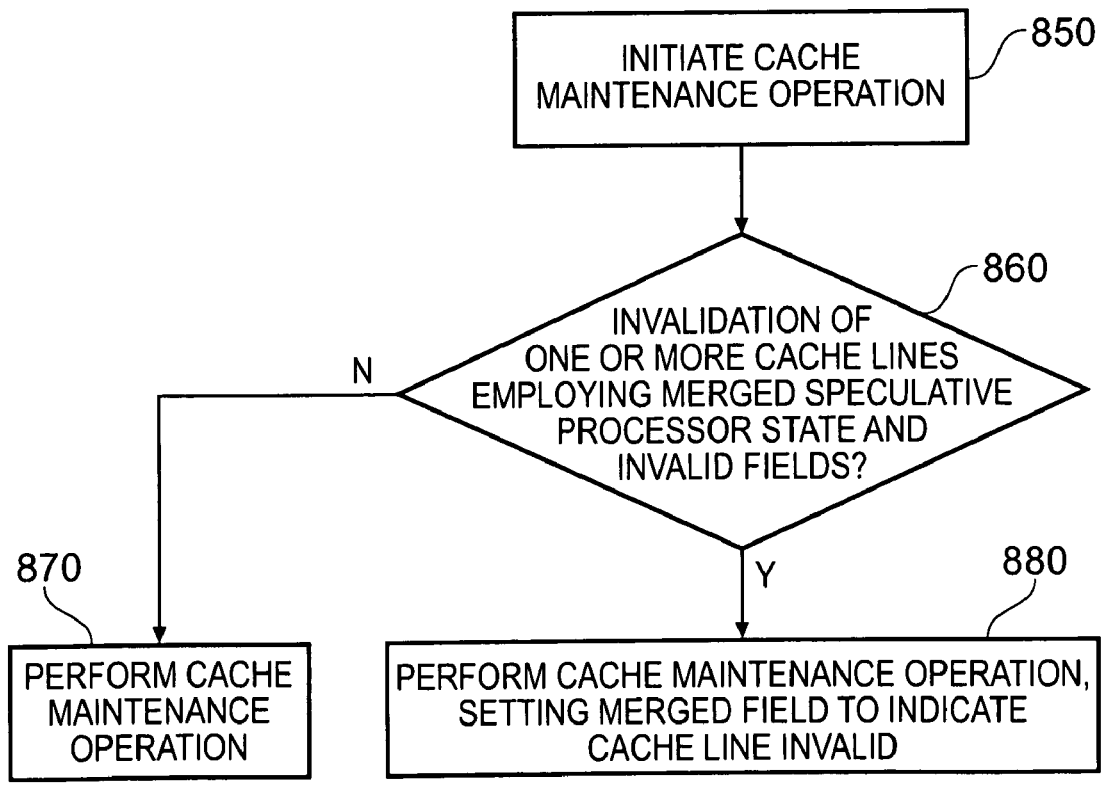

Similarly, considering the example of cache maintenance operations performed whilst the data processing apparatus is running, these may also require the contents of certain cache lines, cache ways or of an entire cache to be invalidated. As shown in FIG. 33B, on initiating a cache maintenance operation at step 850, it is determined at step 860 whether invalidation is required in respect of one or more cache lines employing merged fields for speculative processor state and invalid identifiers. If so, the process proceeds to step 880 where the cache maintenance operation is performed, during which the relevant merged fields have their value set to represent the invalid identifier. If invalidation is not required in respect of any cache lines employing merged fields for speculative processor state and invalid identifiers, then the cache maintenance operation is performed in the standard manner at step 870. In this instance it is still likely that certain cache lines will be invalidated, but those cache lines will employ standard valid bits which can be set to identify an invalid cache line in the standard manner.

From the above description, it will be seen that through storing of the speculative processor state in the cache, it is possible to later detect a condition where the assumption of speculative processor state by the pre-decoding circuitry was wrong, and accordingly the pre-decoded instruction read from the cache should not be used by the processing circuitry. This provides a simple and effective, power efficient, mechanism for detecting certain situations where instructions have been corrupted by the pre-decoding process.

Figure 24:
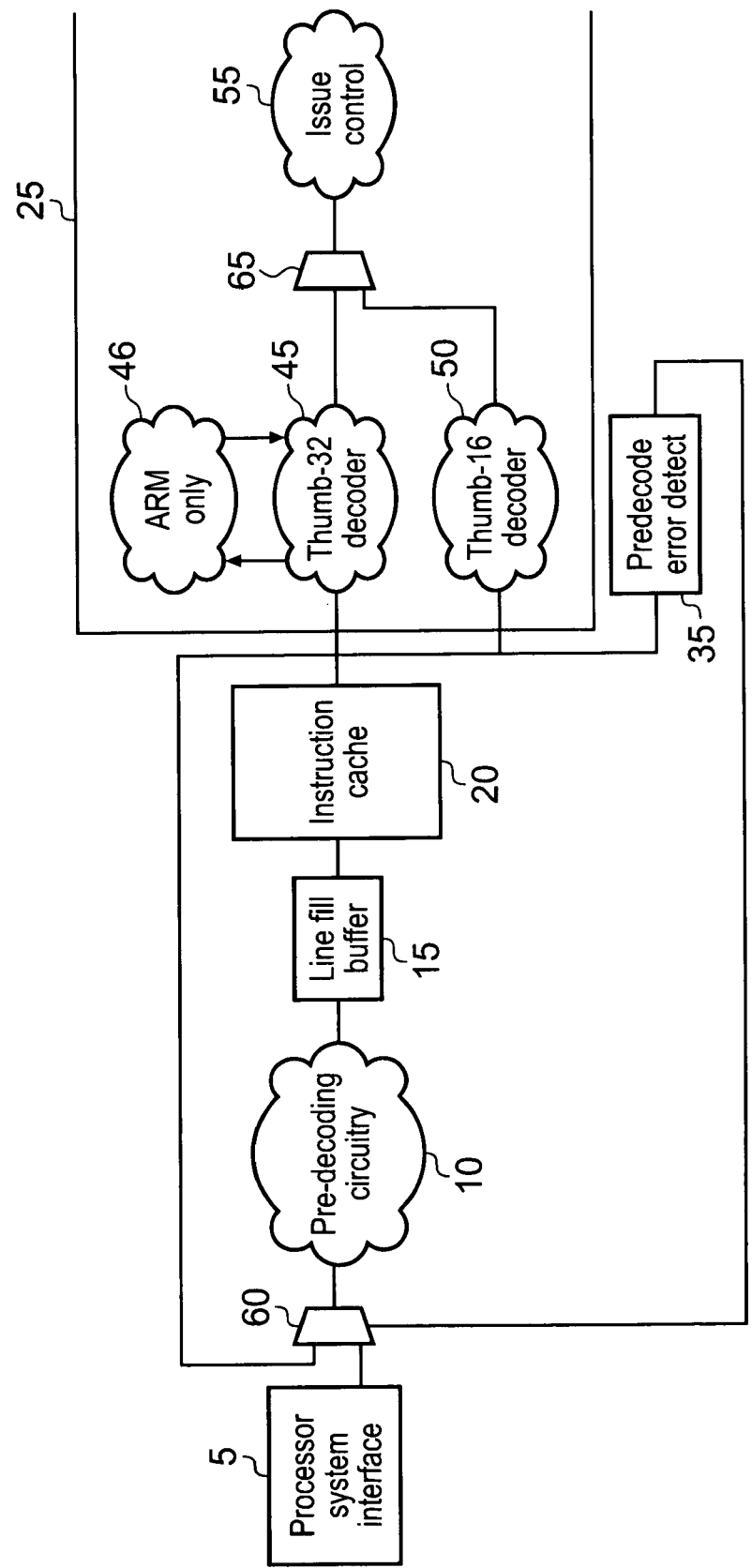
FIG. 24 schematically illustrates a portion of a processing pipeline having decoding circuitry including a shared portion used to decode pre-decoded instructions corresponding to instructions in different instruction sets.

FIG. 24 illustrates an instruction pipeline having a form similar to those previously described. This instruction pipeline supports pre-decoding and subsequent execution of processing operations corresponding to instructions of three different sets of instructions, namely ARM instructions, Thumb32 instructions, and Thumb16 instructions. It has been recognised that many common ARM instructions share or have functionality closely corresponding to instructions which are also present within the Thumb32 instructions. This recognition may be exploited by using a system in which ARM instructions are pre-decoded by the pre-decoding circuitry 10 to form pre-decoded instructions stored within the instruction cache 20 and using a shared format to represent shared functionality with corresponding Thumb32 instructions. Thus, in the de-coded instructions stored within the instruction cache 20, the individual pre-decoded instructions corresponding to either ARM instructions or Thumb32 instructions will share the same format to represent the same functionality. The re-mapping performed on ARM instructions by the pre-decoding circuitry 10 seeking to re-map them into a form in which they are represented within the pre-decoded instructions in the same way as Thumb32 instructions represents additional activity at the pre-decoding stage, but this activity will be performed when the instructions are being loaded into the instructions cache 20 whereas the pre-decoded instructions which have been re-mapped in this way will typically be read many times from the instruction cache 20 and executed by the remainder of the system. Thus, the additional activity (energy) consumed in the re-mapping is amortised across many uses of the re-mapped instructions.

As will be evident form FIG. 24, the re-mapping of the ARM instructions into a form similar to the Thumb32 instructions in their pre-decoded forms enables the Thumb32 decoding circuitry 45 to be re-used for the majority of the de-coding operations which need to be performed in respect of what were originally ARM instructions. This saves gate count within the decoding circuitry and consequently saves energy.

There are some ARM instructions which do not share functionality closely enough with any Thumb32 instruction that they can be re-mapped into a shared format and for which decoding circuitry is likely already provided within the Thumb32 decoding circuitry 45. In respect of these ARM-only instructions additional decoding circuitry 46 is provided and switched into use when such ARM-only instructions are identified. This ARM-only de-coding circuitry 46 is considerably smaller than a full ARM decoding circuitry block which would be required in conventional multiple instruction set systems.

As previously described, the pre-decoded instructions are thirty six bits in length. The original ARM instructions are 32 bit instructions. Thus, the additional bits within the pre-decoded instructions can be used to represent the previously discussed side band signals as is shown in FIG. 25. The provision of the same side band signals in respect of ARM instructions as well as the other instructions facilitates more efficient decoding within the decoding circuitry 45, 50, 46. One bit within the pre-decoded instruction is used to flag ARM-only instructions for which there is no Thumb32 equivalent and for which the ARM-only decoding circuitry 46 is used to perform decoding and generate appropriate control signals therefrom. This ARM-only bit is selected as a bit having a fixed value within all Thumb32 instructions and which is set to the opposite value within pre-decoded instructions corresponding to ARM-only instructions.

One feature of the ARM instruction set is that every instruction includes four bits of condition codes, namely codes N, C, Z, and V. As shown within FIG. 25, these condition codes are allocated positions within the pre-decoded instruction corresponding to bit positions 16, 17, 34, and 35. These are bit positions normally used for other purposes within pre-decoded instructions corresponding to Thumb32 instructions, namely identification bits, an incomplete bit, and a side band signal. Given that ARM instructions are stored as 32-bit aligned words in memory, the identification and incomplete bits are not required for ARM instructions within the pre-decoded instructions and only one area of side band bits is necessary thereby freeing bitspace within the pre-decoded instructions for ARM instructions in order to represent the condition codes N, C, Z, and V. The Thumb32 de-coding circuitry 45 can be readily modified to respond to these condition codes within pre-decoded instructions for ARM instructions in a manner which gates the execution of those pre-decoded instructions in dependence upon the associated condition code values. If a pre-decoded instruction corresponding to an ARM instruction meets its condition codes, then it will be executed and appropriate control signals generated therefrom. If a pre-decoded instruction does not meet its condition codes then it will not be executed.

FIG. 26 illustrates example of a Thumb32 ADC instruction and an ARM ADC instruction both decoded into the form of a pre-decoded instruction in which shared functionality is represented in a shared format. Corresponding fields within the Thumb32 instruction and the ARM instruction have been given the same names. It will be seen that while the formats of the original Thumb32 instruction and the original ARM instruction are very different, they nevertheless contain nearly all of the same fields and accordingly re-mapping the fields within the ARM instruction into positions within the pre-decoded instruction corresponding to the same position of those fields when a Thumb32 instruction is pre-decoded is relatively simple and efficient. This re-mapping is performed by the pre-decoding circuitry 10 illustrated in FIG. 24.

The ARM instructions include four condition code bits at bit positions [31: 28]. As previously discussed, these condition codes are mapped to bit positions 35, 34, 17, and 16 within the pre-decoded instruction corresponding to an ARM instruction. The pre-decoded instruction corresponding to the ARM instructions still contains side band signals at bit positions [15: 14], but these will apply to the whole of the 36 bits of pre-decoded instruction since ARM instructions are 32-bit aligned in memory and accordingly the issues associated with instructions spanning cache line boundaries do not arise in relation to ARM instructions since the cache lines are word aligned. Also of note within FIG. 26 is bit position 33 within the pre-decoded instructions. This is shown as having a value of "should be 0" in respect of both the pre-decoded instructions corresponding to the Thumb32 instruction and the ARM instruction. This "should be 0" value corresponds to bit 31 within the Thumb32 instruction. If bit 31 within the Thumb32 instruction is not a zero, then this is defined as having unpredictable behaviour.

FIG. 27 illustrates how the unpredictable behaviour associated with the "should be 0" value within the pre-decoded instruction being set to a "1" can be used to provide instruction bitspace within the pre-decoded instruction to represent functionality of the ARM instructions which is not shared by any Thumb32 instructions. In the example of FIG. 27, the ARM instruction for which there is no Thumb32 equivalent is a ADC instruction in it register-shifted register variant. In this variant a shift register Rs specified in bits [11: 8] of the ARM instruction stores a value representing a shift amount to be applied to one of the values stored within the two input source registers Rm, Rn. Thumb32 instructions do not have register-shifted register variants of their ADC instruction. The remainder of the fields within the ARM instruction of FIG. 27 are similar to those illustrated in FIG. 26. However, the register-shifted register variant of the ARM instruction does not include an immediate field. This immediate field was mapped to bits [32:30] and [23:22] within the pre-decoded instructions for both the Thumb32 and ARM instructions of FIG. 26. This bitspace within the pre-decoded instructions can be re-used to represent the register identifier Rs of the register storing the shift value within the register-shifted register version of the ARM instruction for the pre-decoded instruction form of FIG. 27. The decoding circuitry 45 is configured to recognise the pre-decoded instruction supplied to it as having this particular form by the setting of the "should be 0" bit 33 to a value of "1" in the pre-decoded instruction representing an ADC of a register-shifted register variant ARM instruction.

This behaviour whereby bitspace corresponding to unpredictable behaviour for the Thumb32 instructions is re-used to represent ARM-only variant instructions can be contrasted with the use of the ARM-only bit at bit position 13. The ARM-only bit at bit position 13 can be reserved for instructions with much less similarity to any Thumb32 instructions and for which the ARM-only decoding circuitry 46 is provided. Re-using the bitspace corresponding to the unpredictable behaviour in Thumb32 instructions not only preserves instruction bitspace within the pre-decoded instructions it also facilitates re-use of the same gates within the shared portion of the decoding circuitry 45.

Figure 28:
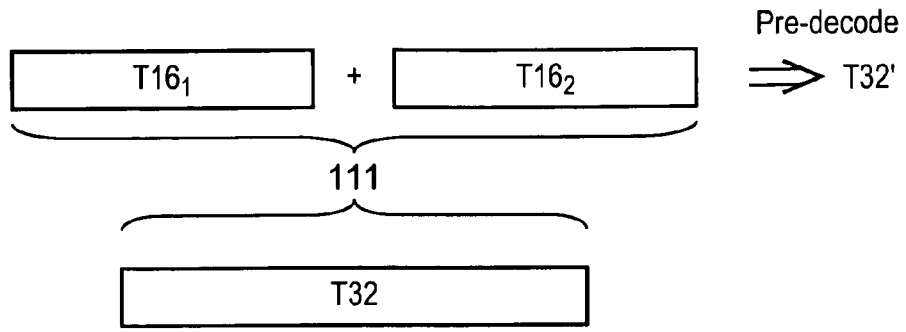
FIG. 28 illustrates how two adjacent Thumb16 instructions may be concatenated and pre-decoded into a pre-decoded instruction corresponding to a single Thumb32 instruction.

FIG. 28 illustrates a further feature which may be provided by the pre-decoding circuitry 10. It has been recognised that sequences of Thumb16 instructions can include adjacent instructions specifying combined functionality corresponding to a single Thumb32 instruction. The pre-decoding circuitry can recognise this by pre-decoding the adjacent Thumb16 instructions into a single pre-decoded instruction corresponding to the equivalent Thumb32 instruction. The single pre-decoded instruction corresponding to the Thumb32 instruction will be issued as a single entity into the execution pipeline and accordingly executed more rapidly and efficiently then would two separate Thumb16 instructions. The pre-decoding circuitry 10 can concentrate on a relatively small number of common cases where two adjacent Thumb16 instructions may be re-mapped to a corresponding pre-decoded form of a Thumb32 instruction in order to balance the benefit and cost of providing the additional circuitry to identify such opportunities.

Figure 29:
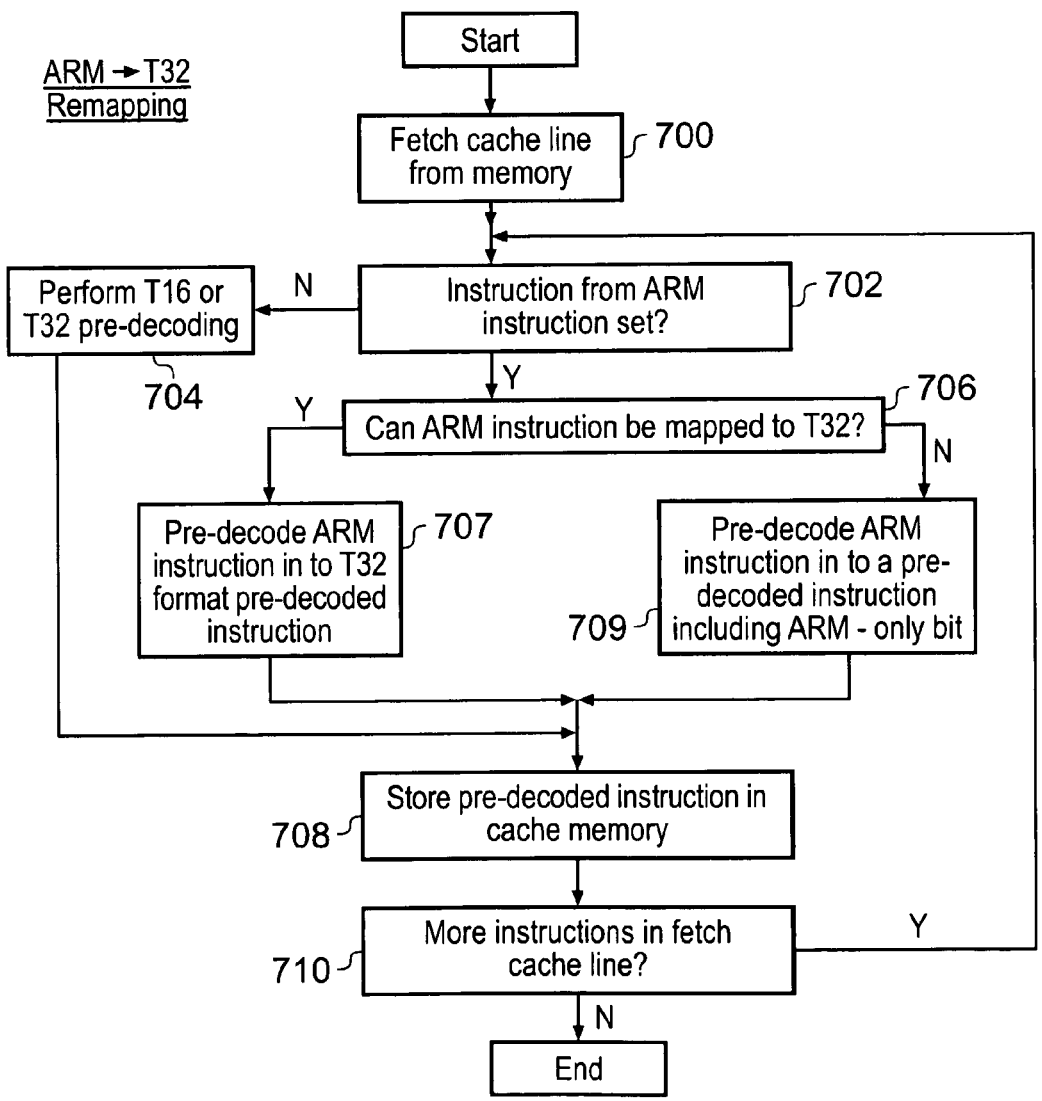
FIG. 29 is a flow diagram schematically illustrating the re-mapping of ARM instructions to Thumb32 instructions.

FIG. 29 is a flow diagram schematically illustrating the re-mapping of ARM instructions to Thumb32 instructions within the pre-decoding circuitry. At step 700, a cache line is fetched from memory. At step 702, a determination is made as to whether or not the first instruction to be de-coded is from the ARM instruction set. If the instruction to be pre-decoded is not from the ARM instruction set, then processing proceeds to step 704 at which pre-decoding in accordance with either a Thumb16 or Thumb32 instruction is performed.

If the determination at step 702 was that the instruction to be decoded is an ARM instruction, then step 706 determines whether the ARM instruction can be mapped to a T32 format pre-decoded instruction for decoding with a shared portion of the decoder. If the ARM instruction can be mapped in this way then processing proceeds via step 707. If the ARM instruction cannot be mapped in this way the step 709 pre-decodes the ARM instruction into a pre-decoded instruction with the ARM-only bit set so that a non-shared portion of the decoder will be used. Step 708 then stores the pre-decoded instructions in the cache memory 20. Step 710 determines whether or not there are more instructions in the fetched cache line fill which pre-decoding is required. If there are more such instructions, then processing returns to step 702, otherwise the processing halts.

Figure 30:
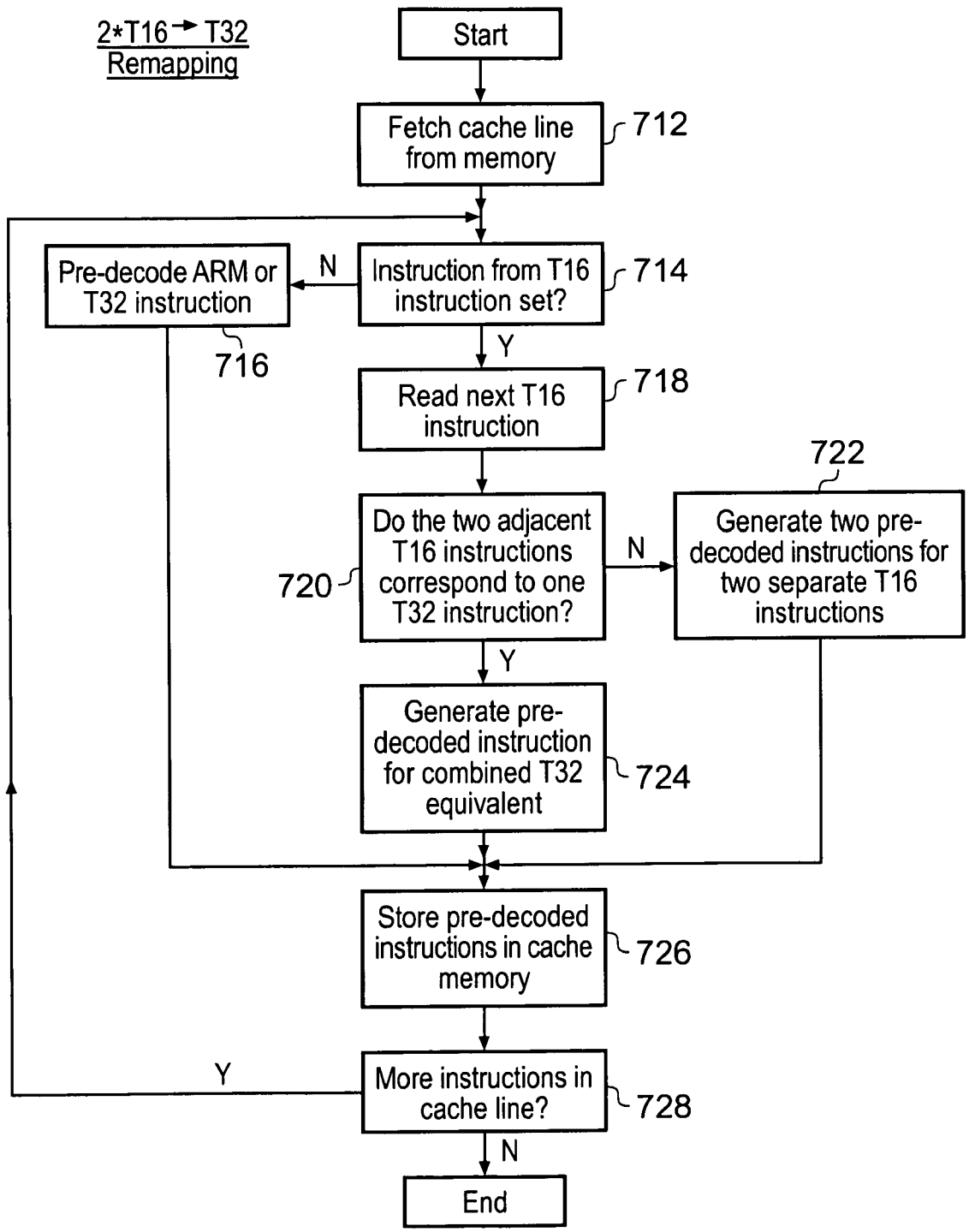
FIG. 30 illustrates how two Thumb16 instructions can be re-mapped during pre-decoding to a pre-decoding instruction corresponding to a single Thumb32 instruction.

FIG. 30 is a flow diagram schematically illustrating how two Thumb16 instructions may be re-mapped into a pre-decoded instruction corresponding to a single Thumb32 instruction. At step 712 a cache line is fetched from memory. At step 714 a determination is made as to whether or not the first instruction to be decoded is a Thumb16 instruction. If the instruction is not a Thumb16 instruction, then processing proceeds to step 716 where the pre-decoding is performed in accordance with the appropriate behaviour for an ARM or a Thumb32 instruction.

If the determination at step 714 was that the instruction fetched is a Thumb16 instruction, then step 718 reads the next Thumb16 instruction and step 720 identifies whether the two adjacent Thumb16 instructions correspond to one Thumb32 instruction.

If the determination at step 720 was that the two adjacent Thumb16 instructions do not correspond to one Thumb32 instruction, then step 722 generates pre-decoded instructions for two separate Thumb16 instructions. However, if the determination at step 720 was that the two adjacent Thumb16 instructions do correspond to one Thumb32 instruction, then step 724 generates a pre-decoded instruction corresponding to the equivalent Thumb32 instruction as opposed to the two separate Thumb16 instructions that would be generated by step 722.

Step 726 stores the pre-decoded instructions into the instruction cache 20. Step 728 then determines whether or not there are more instructions within the fetched cache line that require pre-decoding. If there are more such instructions then processing returns to step 714.

Figure 31:
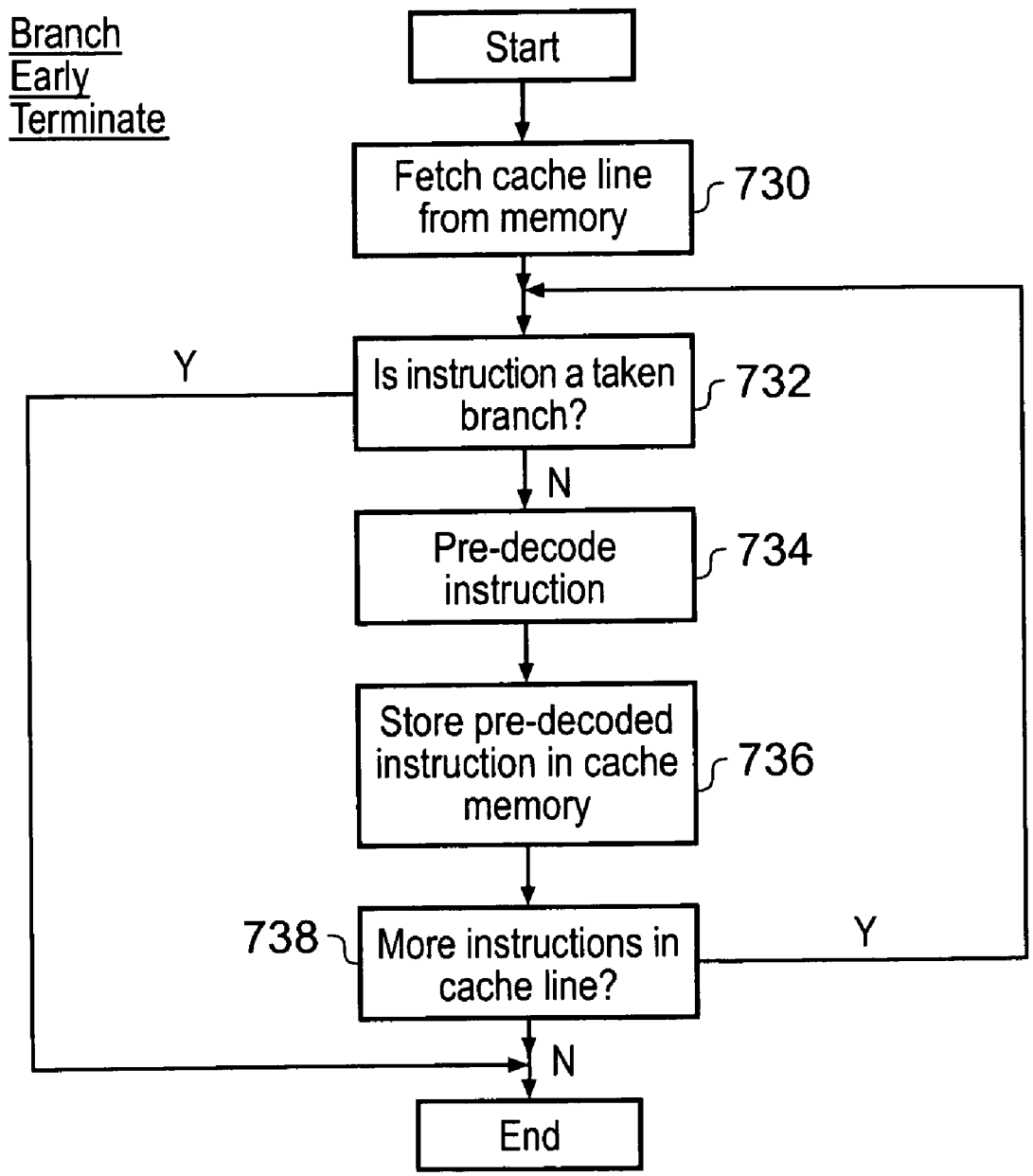
FIG. 31 is a flow diagram schematically illustrating how branch instructions can be identified during pre-decoding and used to trigger early termination of pre-decoding.

FIG. 31 illustrates a flow diagram corresponding to processing which can be performed within the pre-decoding circuitry 10 to identify branch instructions and early terminate pre-decoding operations. If a branch instruction which either will be taken, or is predicated taken, is encountered, then it can be energy efficient to early-terminate pre-decoding as the energy expended upon such pre-decoding is wasted since it is likely that instructions subsequent to the branch (or predicted taken branch) will not be executed. At step 730, a cache line is fetched from memory. At step 732, the pre-decoding circuitry 10 identifies whether or not the instruction being pre-decoded is a taken branch. If the instruction being pre-decoded is a taken branch (e.g. an unconditional branch (ump)), then processing terminates. If the determination at step 732 is that the instruction is not a taken branch, then the instruction is pre-decoded at step 734. Step 736 then stores the pre-decoded instruction within the instruction cache 20 and step 738 determines whether or not there are more instructions within the cache line which required pre-decoding. If there are more such instructions then processing returns to step 732.

It will be appreciated that the processes illustrated by the flow diagrams of FIGS. 29, 30, and 31 are illustrated as sequential processes and processes which are independent of one another. Those familiar with this technical field will realise that when these processes are implemented using the pre-decoding circuitry 10, these processes may well occur with a different ordering of steps or with some steps being performed in parallel. Furthermore, the processes which are illustrated separately in FIGS. 29, 30, and 31 will likely in practise be performed at least partially in parallel. The present techniques encompass all of these various alternatives.

Although particular embodiments have been described herein, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. A data processing apparatus comprising:
processing circuitry for executing a sequence of instructions fetched from memory, the processing circuitry having a plurality of processor states, each processor state having a different instruction set associated therewith;
pre-decoding circuitry for receiving the instructions fetched from memory and performing a pre-decoding operation to generate corresponding pre-decoded instructions;
a cache for storing the pre-decoded instructions for access by the processing circuitry;
the pre-decoding circuitry performing the pre-decoding operation assuming a speculative processor state, and the cache being arranged to store an indication of the speculative processor state in association with the pre-decoded instructions;
the processing circuitry configured only to execute an instruction in the sequence using the corresponding pre-decoded instruction from the cache if a current processor state of the processing circuitry matches the indication of the speculative processor state stored in the cache in association with that corresponding pre-decoded instruction, wherein in response to an access request issued by the processing circuitry, a plurality of instructions are fetched from the cache; and
error detection circuitry, responsive to one of the plurality of instructions being a state changing instruction which does not cause a branch to occur, configured to trigger a state error for any subsequent instruction in said plurality of instructions in order to initiate a fetch operation from the memory starting at a memory address immediately after a memory address of the state changing instruction.

2. A data processing apparatus as claimed in claim 1, wherein the pre-decoding circuitry uses as the speculative processor state the processor state which the processing circuitry is in at the time the pre-decoding operation is performed.

3. A data processing apparatus as claimed in claim 1, wherein when the processing circuitry issues an access request specifying an address of an instruction in the sequence, the cache performs a lookup operation to determine whether the corresponding pre-ecoded instruction is present in the cache and further to determine whether the current processor state matches the speculative processor state, the cache only detecting a hit condition if both the corresponding pre-decoded instruction is in the cache and the current processor state matches the speculative processor state stored in the cache in association with that corresponding pre-ecoded instruction.

4. A data processing apparatus as claimed in claim 3, wherein if the lookup operation identifies that the corresponding pre-decoded instruction is in the cache but the current processor state does not match the speculative processor state stored in the cache in association with that corresponding pre-decoded instruction, the cache generates a miss condition causing a linefill operation to be performed to re-fetch from the memory the instruction the subject of the access request.

5. A data processing apparatus as claimed in claim 4, wherein the linefill operation causes a cache line's worth of instructions including the instruction the subject of the access request to be re-fetched from the memory, and re-passed through the pre-decoding circuitry to generate the corresponding pre-decoded instructions, during this re-pass through the pre-decoding circuitry the speculative processor state matching the current processor state.

6. A data processing apparatus as claimed in claim 1, wherein:
the cache is further arranged to store an invalid identifier in association with the pre-decoded instructions to identify if those pre-decoded instructions are invalid;
the indication of speculative processor state is stored in a multi-bit field having n possible values, the number of different speculative processor states being less than n, and the invalid identifier being encoded using one of the n possible values not used to represent a speculative processor state.

7. A data processing apparatus as claimed in claim 1, wherein:
the cache comprises a data portion having a plurality of cache lines for storing the pre-decoded instructions, and a tag portion having an entry for each cache line, each entry storing an address identifier associated with the pre-decoded instructions stored in the corresponding cache line; and
the indication of the speculative processor state used by the pre-decoding circuitry is stored in each entry of the tag portion.

8. A data processing apparatus as claimed in claim 7, wherein:
the cache is further arranged to store in each entry of the tag portion an invalid identifier to identify if the pre-decoded instructions in the corresponding cache line are invalid;
the indication of speculative processor state is stored in a multi-bit field within each entry of the tag portion, the multi-bit field having n possible values, the number of different speculative processor states being less than n, and the invalid identifier being encoded within the multi-bit field using one of the n possible values not used to represent a speculative processor state.

9. A data processing apparatus as claimed in claim 8, wherein, during a startup procedure of the data processing apparatus, the cache is arranged to mark the pre-decoded instructions in one or more cache lines as being invalid by storing the invalid identifier in the multi-bit field of the corresponding one or more entries in the tag portion.

10. A data processing apparatus as claimed in claim 8, wherein, during performance of a cache maintenance operation, the cache is arranged to mark the pre-decoded instructions in one or more cache lines as being invalid by storing the invalid identifier in the multi-bit field of the corresponding one or more entries in the tag portion.

11. A data processing apparatus as claimed in claim 1, wherein:
the cache comprises a data portion having a plurality of cache lines for storing the pre-decoded instructions, and a tag portion having an entry for each cache line, each entry storing an address identifier associated with the pre-decoded instructions stored in the corresponding cache line; and
the indication of the speculative processor state used by the pre-decoding circuitry is stored in association with each pre-decoded instruction stored in the data portion.

12. A data processing apparatus as claimed in claim 1, wherein the cache is an instruction cache used to store the pre-decoded instructions.

13. A data processing apparatus as claimed in claim 1, wherein:
the cache is a combined instruction and data cache, each cache line of the cache storing either pre-decoded instructions generated by the pre-decoding circuitry, or data values not subjected to the pre-decode operation; and
each cache line has an identifier field associated therewith for identifying whether that cache line stores pre-decoded instructions or stores data values.

14. A method of handling instructions in a data processing apparatus, the data processing apparatus including processing circuitry configured to execute a sequence of instructions, the processing circuitry having a plurality of processor states, each processor state having a different instruction set associated therewith, the method comprising the steps of:
retrieving instructions from memory and performing a pre-decoding operation on those instructions to generate corresponding pre-decoded instructions, a speculative processor state being assumed when performing the pre-decoding operation;
storing each pre-decoded instruction in a cache, along with an indication of the speculative processor state assumed by the pre-decoding operation when generating that pre-decoded instruction, the processing circuitry only executing an instruction in the sequence using the corresponding pre-decoded instruction from the cache if a current processor state of the processing circuitry matches the indication of the speculative processor state stored in the cache in association with that corresponding pre-decoded instruction;
fetching a plurality of instructions from said cache in response to an access request issued by said processing circuitry; and
triggering, in response to one of the plurality of instructions being a state changing instruction which does not cause a branch to occur, a state error for any subsequent instruction in said plurality of instructions, and initiating a fetch operation from the memory starting at a memory address immediately after a memory address of said state changing instruction.

15. A data processing apparatus comprising:
processing means for executing a sequence of instructions fetched from memory, the processing means having a plurality of processor states, each processor state having a different instruction set associated therewith;

pre-decoding means for receiving the instructions fetched from memory and performing a pre-decoding operation to generate corresponding pre-decoded instructions;

a cache means for storing the pre-decoded instructions for access by the processing means, wherein the pre-decoding means assumes a speculative processor state, and the cache means is configured to store an indication of the speculative processor state in association with the pre-decoded instructions;

the processing means only executing an instruction in the sequence using the corresponding pre-decoded instruction from the cache means if a current processor state of the processing means matches the indication of the speculative processor state stored in the cache means in association with that corresponding pre-decoded instruction; and error detection means for triggering, in response to one of a plurality of instructions fetched from said cache means in response to an access request issued by said processing means being a state changing instruction which does not cause a branch to occur, a state error for any subsequent instruction in said plurality of instructions, and for initiating a fetch operation from the memory starting at a memory address immediately after a memory address of said state changing instruction.

* * * * *